United States Patent
Kounavis et al.

(10) Patent No.: US 11,469,902 B2
(45) Date of Patent: Oct. 11, 2022

(54) SYSTEMS AND METHODS OF USING CRYPTOGRAPHIC PRIMITIVES FOR ERROR LOCATION, CORRECTION, AND DEVICE RECOVERY

(71) Applicant: Intel Corporation, Santa Clara, CA (US)

(72) Inventors: Michael Kounavis, Portland, OR (US); Sergej Deutsch, Hillsboro, OR (US); David Durham, Beaverton, OR (US); Karanvir Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 779 days.

(21) Appl. No.: 16/369,989

(22) Filed: Mar. 29, 2019

(65) Prior Publication Data

US 2019/0229925 A1    Jul. 25, 2019

(51) Int. Cl.
*H04L 29/06* (2006.01)
*H04L 9/32* (2006.01)
*H04L 9/06* (2006.01)
*G06F 11/20* (2006.01)

(52) U.S. Cl.
CPC ........ *H04L 9/3242* (2013.01); *G06F 11/2094* (2013.01); *H04L 9/0631* (2013.01); *H04L 9/0637* (2013.01); *G06F 2201/82* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 9,990,249 B2 | 6/2018 | Durham et al. | |
| 2018/0091308 A1 | 3/2018 | Durham et al. | |
| 2019/0042359 A1 | 2/2019 | Durham | |
| 2020/0184462 A1* | 6/2020 | Rule | G06Q 20/409 |

FOREIGN PATENT DOCUMENTS

| | | | | |
|---|---|---|---|---|
| EP | 3468147 A1 * | 4/2019 | ......... | H04L 63/0428 |
| EP | 3624391 A1 * | 3/2020 | ........... | H04L 9/0822 |

* cited by examiner

*Primary Examiner* — Andrew J Steinle
(74) *Attorney, Agent, or Firm* — Alliance IP, LLC

(57) ABSTRACT

The present disclosure is directed to systems and methods for the secure transmission of plaintext data blocks encrypted using a NIST standard encryption to provide a plurality of ciphertext data blocks, and using the ciphertext data blocks to generate a Galois multiplication-based authentication tag and parity information that is communicated in parallel with the ciphertext blocks and provides a mechanism for error detection, location and correction for a single ciphertext data block or a plurality of ciphertext data blocks included on a storage device. The systems and methods include encrypting a plurality of plaintext blocks to provide a plurality of ciphertext blocks. The systems and methods include generating a Galois Message Authentication Code (GMAC) authentication tag and parity information using the ciphertext blocks. The GMAC authentication tag may be encrypted to provide a GIMAC authentication tag that is communicated in parallel with the ciphertext blocks to one or more recipient systems or devices.

25 Claims, 6 Drawing Sheets

SYSTEMS AND METHODS OF USING CRYPTOGRAPHIC PRIMITIVES FOR ERROR LOCATION, CORRECTION, AND DEVICE RECOVERY

TECHNICAL FIELD

The present disclosure relates to error detection, correction, and device recovery, more specifically to error detection, correction, and device recovery using NIST approved cryptographic primitives.

BACKGROUND

Many error detection and correction regimens in storage and/or memory system employ non-standard cryptographic algorithms for cryptographic integrity. The use of non-standard algorithms limits the acceptance and adoption of the technology in some sectors such as in governmental and institutional environments.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
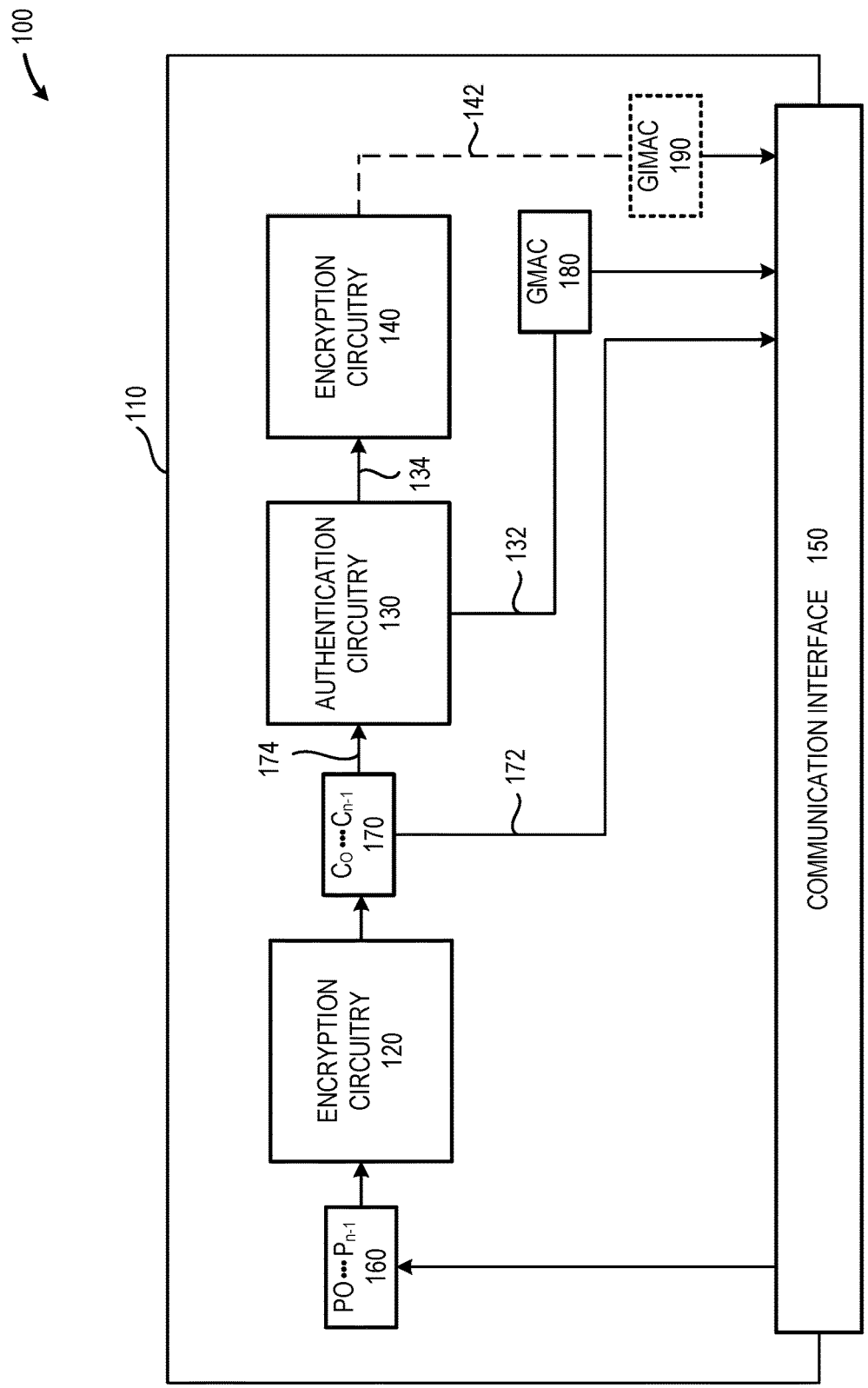
FIG. 1 is a block diagram of an illustrative system that includes an encryption system having plaintext encryption circuitry, authentication circuitry, and in some embodiments authentication encryption circuitry, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods disclosed herein implement a Memory Authentication, cryptographic Integrity and Correction (MAGIC) regimen using encryption circuitry and authentication circuitry to implement standard, National Institute of Standards and Technology (NIST) approved, crypto primitives. For example, the systems and methods described herein implement an Advanced Encryption Standard-XEX-based tweaked-codebook mode with ciphertext stealing (AES-XTS) encryption and a Galois Message Authentication Code (GMAC) based message authentication. In addition, the GMAC authentication may be encrypted to provide GMAC-based, Improved, Memory Authentication, Cryptographic Integrity and Correction (GIMAC) data encryption, authentication and recovery systems and methods.

The systems and methods disclosed herein encrypt incoming plaintext data blocks (e.g., 128-bit data blocks) using a standard AES encryption protocol to produce a ciphertext blocks. Rather than determining parity using the plaintext data blocks, the systems and methods disclosed herein determine parity using the encrypted ciphertext blocks. The systems and methods disclosed herein determines the parity using the GMAC authentication tag computed on the input ciphertext blocks. Beneficially, the systems and methods disclosed herein provide error location, error correction, and full device recovery capabilities using standard cryptographic techniques. The systems and methods described herein offer advantages over systems and methods using plaintext to determine the Message Authentication Code (MAC) by avoiding the serialization of decryption and the computation of integrity tags. Further, the systems and methods disclosed herein provide greater resistance to authentication code substitution attacks than other systems and methods using a plaintext based authentication code due to the use of the relatively simple bit-wise XOR as a functional parity mechanism.

The systems and methods disclosed herein accept, as an input, a set of n 128-bit plaintext blocks: $P_0, P_1, \ldots P_{n-1}$. The systems and methods disclosed herein then use a standardized encryption technique to encrypt the n 128-bit plaintext blocks: $P_0, P_1, \ldots P_{n-1}$ to provide n ciphertext blocks: $C_0, C_1, \ldots C_{n-1}$. For example, the systems and methods described herein may use the XTS mode of the AES block cipher with a secret key value $K_D$, and a first initialization vector $IV_1$ to encrypt the n 128-bit plaintext blocks: $P_0, P_1, \ldots P_{n-1}$ to provide n ciphertext blocks: $C_0, C_1, \ldots C_{n-1}$. After encrypting the plaintext blocks, the systems and methods disclosed herein then determine a message authentication code (MAC) using the n ciphertext blocks $C_0, C_1, \ldots C_{n-1}$. In embodiments, the MAC may include an authentication tag using Galois multiplication. Such a Galois Message Authentication Code (GMAC) may be used to provide parity data associated with the n ciphertext blocks. For example, the systems and methods disclosed herein may determine GMAC based on the n ciphertext blocks, a second initialization vector $IV_2$, a second secret key value $K_M$, and a secret hash key value $H_D = H$. Although equations associated with one or more embodiments are presented below, those of ordinary skill in the relevant arts will readily appreciate that the systems and methods disclosed herein may perform other mathematical and/or logical operations to provide a functionally and/or mathematically equivalent result may be substituted.

The systems and methods disclosed herein may compute the GMAC value ("G") using the following equation:

$$G = C_0 \cdot H + C_1 \cdot H^2 + \ldots + C_{n-1} \cdot H^n + C_G \qquad (1)$$

where:

$$C_G = (128n) \cdot H^{n+1} + C_{K_M IV_2}$$

$$C_{K_M IV_2} = \text{Constant Determined Using } IV_2 \text{ and } K_m \qquad (2)$$

In addition, the systems and methods disclosed herein may encrypt the GMAC/parity value G using the ECB mode using a standard AES encryption protocol.

An autonomous error correction and recovery system is provided. The system may include: encrypt a plurality of plaintext blocks ($P_0 \ldots P_{n-1}$) to provide a plurality of ciphertext blocks ($C_0 \ldots C_{n-1}$); authentication circuitry communicatively coupled to the encryption circuitry, the authentication circuitry to: determine a parity value using the plurality of ciphertext blocks generated by the encryption circuitry; generate a GMAC authentication tag using the plurality of ciphertext blocks generated by the encryption circuitry; and a communication interface to receive the plurality of ciphertext blocks, the determined parity value, and the generated GMAC authentication tag.

An autonomous error correction and recovery method is provided. The method may include: encrypting, by encryption circuitry, a plurality of plaintext blocks ($P_0 \ldots P_{n-1}$) to provide a plurality of ciphertext blocks ($C_0 \ldots C_{n-1}$); determining, by authentication circuitry communicably coupled to the encryption circuitry, a parity value using the plurality of ciphertext blocks generated by the encryption circuitry; generating, by the authentication circuitry, a GMAC authentication tag using the plurality of ciphertext blocks generated by the encryption circuitry; communicating, by the encryption circuitry to a communicably coupled communication interface, the plurality of ciphertext blocks; and communicating, by the authentication circuitry to the communicably coupled communication interface, the determined parity value and the generated GMAC authentication tag.

An autonomous error correction and recovery system is provided. The system may include: means for encrypting a plurality of plaintext blocks ($P_0 \ldots P_{n-1}$) to provide a plurality of ciphertext blocks ($C_0 \ldots C_{n-1}$); means for determining a parity value using the plurality of ciphertext blocks generated by the encryption circuitry; means for generating a GMAC authentication tag using the plurality of ciphertext blocks generated by the encryption circuitry; means for communicating the plurality of ciphertext blocks; and means for communicating the determined parity value and the generated GMAC authentication tag.

A non-transitory storage device is provided. The non-transitory storage device may include instructions that, when executed by control circuitry, cause the control circuitry to: cause encryption circuitry to encrypt a plurality of plaintext blocks ($P_0 \ldots P_{n-1}$) to provide a plurality of ciphertext blocks ($C_0 \ldots C_{n-1}$); cause authentication circuitry to determine communicably coupled to the encryption circuitry, a parity value using the plurality of ciphertext blocks generated by the encryption circuitry; cause the authentication circuitry to generate a Galois message authentication code (GMAC) authentication tag using the plurality of ciphertext blocks generated by the encryption circuitry; cause the encryption circuitry to communicate to the plurality of ciphertext blocks a communicably coupled communication interface; and cause the authentication circuitry to communicate the determined parity value and the generated GMAC authentication tag to the communicably coupled communication interface.

A processor-based electronic device is provided. The processor-based device may include: processor circuitry; processor cache memory circuitry communicatively coupled to the processor circuitry; system memory circuitry communicatively coupled to the processor circuitry; and autonomous error correction and recovery circuitry communicably coupled to the processor circuitry and the system memory circuitry, the autonomous error correction and recovery circuitry including: encryption circuitry to: encrypt a plurality of plaintext blocks ($P_0, P_1, \ldots P_{n-1}$) to provide a plurality of ciphertext blocks ($C_0, C_1, \ldots C_{n-1}$); authentication circuitry communicatively coupled to the encryption circuitry, the authentication circuitry to: generate a Galois message authentication code (GMAC) authentication tag using the plurality of ciphertext blocks generated by the encryption circuitry; determine a parity value using the GMAC authentication tag; and a communication interface to receive the plurality of ciphertext blocks, the determined parity value, the parity value, and the generated GMAC authentication tag.

As used herein, the term "Galois Message Authentication Code" and/or the acronym "GMAC" may refer to Galois authentication codes having any width, finite fields, and/or bit reflection choices. As disclosed herein, for clarity and ease of discussion, the systems and methods address embodiments use $GF(2^{128})$, a standard GMAC algorithm. The function and mathematics of the systems and methods disclosed herein are similar or identical irrespective of the width and finite fields used.

FIG. 1 is a block diagram of an illustrative system 100 that includes an encryption system 110 having plaintext encryption circuitry 120, authentication circuitry 130, and in some embodiments authentication encryption circuitry 140, in accordance with at least one embodiment described herein. As depicted in FIG. 1, the encryption system 110 may also include one or more communication interfaces 150. In embodiments, the encryption system 110 may receive, via the communication interface 150, a plurality of plaintext blocks 160. Using AES compliant encryption, the plaintext encryption circuitry 120 encrypts the received plaintext blocks 160 to provide a plurality of ciphertext blocks 170. Using the ciphertext blocks 170, the authentication circuitry 130 generates a parity value and an authentication tag. In embodiments, the authentication circuitry 130 generates a GMAC authentication tag 180. In embodiments, the encryption system 110 communicates the GMAC authentication tag 180 contemporaneous with the ciphertext blocks 170 to one or more external devices via the communication interface 150. In embodiments, the authentication encryption circuitry 140 may additionally encrypt the GMAC authentication tag 180 to provide an encrypted authentication tag (GIMAC) 190. In such embodiments, the encryption system 110 communicates the GIMAC authentication tag 190 contemporaneous with the ciphertext blocks 170 to one or more external devices via the communication interface 150.

In embodiments, the encryption system 110 may include one or more systems, circuits, and/or devices communicatively coupled to one or more memory circuits within a host system. Such memory circuits may include, without limitation, one or more processor cache memory circuits, one or more system memory circuits, or similar. In embodiments, all or a portion of the encryption system 110 may be disposed, formed, or included in processor circuitry, controller circuitry, such as memory management unit (MMU)

circuitry, or combinations thereof. In other embodiments, all or a portion of the encryption system 110 may be disposed, formed, or otherwise included in a system-on-ship (SoC), an application specific integrated circuit (ASIC), a field programmable gate array (FPGA), or a digital signal processor (DSP). In embodiments, the encryption system 110 may be disposed, in whole or in part, on a semiconductor chiplet that is included in a multi-chip module (MCM).

The plaintext encryption circuitry 120 includes any number and/or combination of currently available and/or future developed electrical components, semiconductor devices, or logic elements capable of receiving a plurality of plaintext data blocks 160 ($P_0$, $P_1$, . . . $P_{n-1}$) and encrypting the plurality of plaintext data blocks using an Advanced Encryption Standard (AES) compliant encryption to generate a corresponding plurality of ciphertext data blocks 170 ($C_0$, $C_1$, . . . $C_{n-1}$). In embodiments, the plaintext encryption circuitry 120 may accommodate the encryption of plaintext data blocks 160 having any size and/or length, such as 128-bit, 192-bit, or 256-bit plaintext data blocks 160. For example, the plaintext encryption circuitry 120 may encrypt a plurality of 128-bit plaintext data blocks. The plaintext encryption circuitry 120 may encrypt the plaintext data blocks 160 using any currently available or future developed AES-compliant encryption method. For example, the plaintext encryption circuitry 120 may encrypt the plaintext data blocks 160 using an Advanced Encryption Standard-XEX-based tweaked-codebook mode with ciphertext stealing (AES-XTS) encryption using a first secret key value ($K_D$) and a first initialization vector value ($IV_1$). The plaintext encryption circuitry 120 generates a plurality ciphertext data blocks 170 ($C_0$, $C_1$, . . . $C_{n-1}$). The ciphertext data blocks 170 are communicated to one or more remote locations 172 via the communication interface 150. The ciphertext data blocks 170 are also communicated to the authentication circuitry 130.

The authentication circuitry 130 includes any number and/or combination of currently available and/or future developed electrical components, semiconductor devices, or logic elements capable of receiving the plurality of ciphertext data blocks 170 ($C_0$, $C_1$, . . . $C_{n-1}$), generating and generating an authentication tag (e.g., a Message Authentication Code or "MAC") using the received plurality of ciphertext data blocks 170. In embodiments, the MAC generated by the authentication circuitry 130 may also provide a parity value for the one or more of the plurality of ciphertext data blocks 170. The authentication circuitry 130 may generate a Message Authentication Code (MAC) using any currently available or future developed authentication method. For example, the authentication circuitry 130 may generate a Galois Message Authentication Code (GMAC) using the plurality of ciphertext data blocks 170, a second secret key $K_M$, a second initialization vector $IV_2$, and a secret hash key value $H_D=H$. In embodiments, the authentication circuitry 130 may determine the GMAC according to the following formula (per National Institute for Standards and Technology ("NIST") Specification SP-800-38D, latest version):

$$G = C_0 \cdot H + C_1 \cdot H^2 + \ldots + C_{n-1} \cdot H^n + C_G \quad (3)$$

where:

$$C_G = (128n) \cdot H^{n+1} + C_{K_M,IV_2} \quad$$

$C_{K_M,IV_2}$=Constant Determined Using $IV_2$ and $K_m$ \quad (4)

In the above, the "+" operation is a carry-less addition operation performed in base-2 Galois Field (i.e., GF(2)), the "·" operation is a bit-reflected multiplication operation performed in the base $2^{128}$ Galois Field (i.e., GF($2^{128}$)), and $C_{K_M,IV_2}$ is a 128-bit value produced using key values $K_M$ and $IV_2$ that may be treated as a constant value. In embodiments, the GMAC value 180 ("G" in equation (3)) may provide the parity value associated with the plurality of ciphertext data blocks 170. In some embodiments, the GMAC value 180 may be communicated 132 to one or more devices external to the encryption system 110 via the communication interface 150. In other embodiments, the GMAC value 180 may be communicated 134 to the authentication encryption circuitry 140 for encryption prior to communication 142 to one or more external devices external to the encryption system 110 via the communication interface 150.

In embodiments, the authentication circuitry 130 may use Galois field multiplication for determining the authentication key and parity. The authentication circuitry 130 may employ a secret hash value "H" raised to one or more powers in performing the Galois field multiplication and in which the exponents of the secret has value need not be sequential values.

The authentication encryption circuitry 140 includes any number and/or combination of currently available and/or future developed electrical components, semiconductor devices, or logic elements capable of receiving the GMAC authentication tag 180 from the authentication circuitry 130 and encrypting the GMAC authentication tag 180 using an Advanced Encryption Standard (AES) compliant encryption to generate a corresponding GMAC-based, Improved, Memory Authentication, Cryptographic Integrity and Correction (GIMAC) authentication tag 190. The authentication encryption circuitry 140 may encrypt the GMAC 180 using any currently available or future developed AES-compliant encryption method. For example, the authentication encryption circuitry 140 may encrypt the GMAC 180 using an Advanced Encryption Standard in the ECB mode using a third secret key $K_G$ according to the following formula:

$$\text{GIMAC} = \text{AES\_ENCRYPT}_{K_G}(G) \quad (5)$$

The authentication encryption circuitry 140 generates an encrypted GMAC, or GIMAC 190 authentication tag. The authentication encryption circuitry 140 communicates the generated GIMAC authentication tag 190 to one or more remote locations 172 via the communication interface 150.

The GIMAC uses the NIST approved GMAC algorithm, however the GIMAC may not address the uniqueness requirement for the initialization vector (IV), as specified in the standard. In embodiments where the initialization vector depends only on the memory address where the parity is determined, then different write operations on the same memory address will be using the same initialization vector. In embodiments, the initialization vector (IV) is determined using the memory address where the parity value is determined, as well as subsets of bits of the input ciphertext blocks ($C_i$). The input ciphertext may be, for instance, the output of a memory encryption engine, and is the same ciphertext used for computing the GIMAC parity. It is produced by mixing all 128 bits of each plaintext block.

In embodiments, let the ciphertext blocks, defined as arrays of bits be:

$$C_0[0: 127], C_1[0: 127], C_2[0: 127], \quad (6)$$

Since each bit of the ciphertext block already carries information from all bits of the corresponding plaintext block it is sufficient to only take few ciphertext bits from each ciphertext block to form the initialization vector. For example, if 8-bits are sourced from each ciphertext block, for instance, and the number of ciphertext blocks is 4, then one can meet a 32-bit second preimage resistance requirement. In other embodiments, a different number of bits may be selected.

The IV formed in this manner is given by:

$$IV = (C_0[0:7] | C_1[0:7] | C_2[0:7]) + A \qquad (7)$$

where '|' means concatenation and A is the memory address associated with the initialization vector. The address may be bound to the IV value, not only via GF(2) addition as in equation (7), but via other mathematical operations that include integer addition, multiplication, and concatenation. Any bits within the ciphertext block may be selected for the generation initialization vector. For instance, if the statistical properties of errors are known, the bits chosen can be those with the least probability to be altered.

This embodiment cannot correct the specific bits from the ciphertext block that participate in the initialization vector generation process but can correct all other bits. For example, if 8 bits are chosen from each ciphertext block 170, the embodiment can correct errors in 480 out of 512 bits, provided that errors are inside one device. The proposed generation process slightly limits the invention's soft error correcting capability (e.g., to 93% if errors are uniform) but uses a fully standard compliant GMAC that satisfies the IV uniqueness requirement. As the encrypted initialization vector is generated from all bits of the plaintext input through a network of pseudo-random permutations (for example, the memory encryption engine and the IV encryption engine) the standard's uniqueness requirement is met.

In embodiments, full device recovery may be accomplished by replacing the bits in the failed device that participate in generating the initialization vector by some arbitrary value. For example, in an 8-bit failed device 256 possible values exist. In such an implementation, a hypothetical value 8-bit value may be selected (e.g., 0x01). The selected hypothetical value may be used to provide an initialization vector that, after encryption, may be XOR-ed with the GMAC value. If the guess is correct then the parity P will be the linear combination of all correct ciphertext block values, multiplied by powers of the hash key H. In this case the reconstructed content of the failed device will be correct and the 8 bits match the hypothetical value 0x01. If however, the hypothetical value is incorrect, the encrypted initialization vector will be an almost random 128 bit value. This will be XOR-ed again with the GMAC value, and the resulting Galois Field combination will be an almost random 128 bit value, resulting in an almost random, incorrect, 128-bit device block.

Since each 8-bit guess typically returns a different recovered block, only the correct hypothesis will be matching with the returned recovered 8 bits in most cases. Collisions will be observed with probability 1/256, where 8 bits are chosen per block. Similarly, device recovery will be possible with probability equal to 1-1/256. In this variant there is some probabilistic aspect to the device recovery process. Device recovery is no longer a deterministic process, but is successful with probability 1-1/256 or 99.6%.

Figure 2:
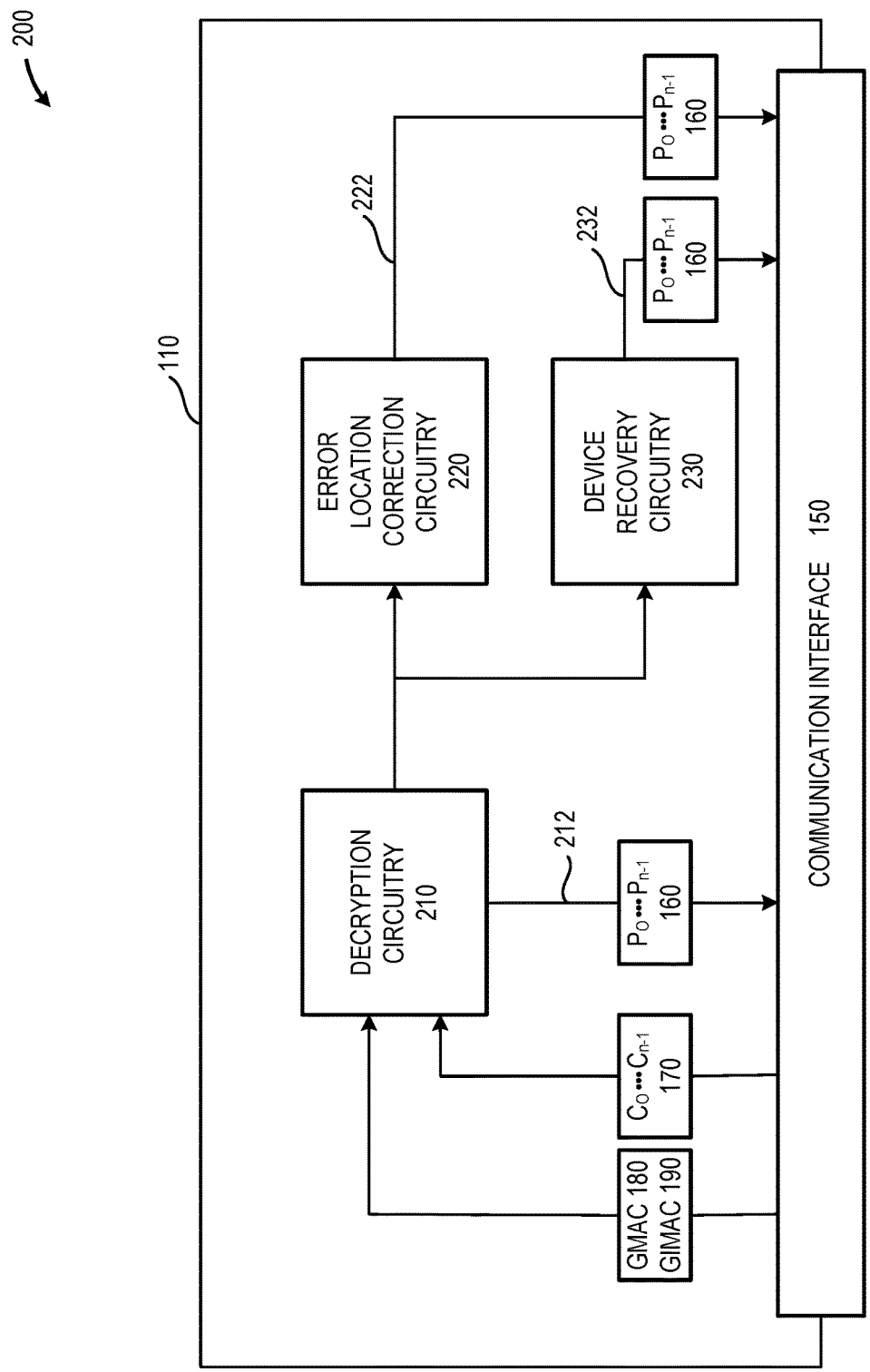
FIG. 2 is a block diagram of an illustrative system in which the encryption system further includes decryption circuitry, error location and/or correction circuitry, and device recovery circuitry, in accordance with at least one embodiment described herein.

FIG. 2 is a block diagram of an illustrative system 200 in which the encryption system 110 further includes decryption circuitry 210, error location and/or correction circuitry 220, and device recovery circuitry 230, in accordance with at least one embodiment described herein. As depicted in FIG. 2, some or all of the decryption circuitry 210, the error location correction circuitry 220, and/or the device recovery circuitry 230, may be communicatively coupled to the communication interface 150. As depicted in FIG. 2, the decryption circuitry 210 receives the plurality of ciphertext data blocks 170 ($C_0, C_1, \ldots C_{n-1}$) and the GMAC 180/GIMAC 190 from the communications circuitry 150. In embodiments, the decryption circuitry 210 may communicate the decrypted data blocks to the error location and correct circuitry 220 and/or the device recovery circuitry 230. In such embodiments, the error correction and location circuitry 220 may communicate 222 the plurality of plaintext data blocks 160 to one or more external devices via the communication interface 150. In such embodiments, the device recovery circuitry 230 may communicate 232 the plurality of plaintext data blocks 160 to one or more external devices via the communication interface 150.

The decryption circuitry 210 includes any number and/or combination of currently available and/or future developed electrical components, semiconductor devices, or logic elements capable of receiving the plurality of ciphertext data blocks 170 ($C_0, C_1, \ldots C_{n-1}$) and at least one of the GMAC authentication tag 180 or the encrypted GMAC (GIMAC) authentication tag 190, decrypting the received plurality of ciphertext data blocks 170, and detecting whether errors have occurred in the communication of the plurality of ciphertext data blocks 170. In embodiments, the decryption circuitry 210 may decrypt the plurality of ciphertext data blocks 170 to provide a plurality of plaintext data blocks 160 and, in the absence of errors or failure to authenticate the received plurality of ciphertext data blocks 170, communicate 212 the plurality of plaintext data blocks 160 to one or more external devices via the communication interface 150. Where errors are detected in the decrypted plurality of ciphertext data blocks 170, the decryption circuitry 210 may forward the decrypted ciphertext data blocks 170, the GMAC authentication code 180 and/or the decrypted GIMAC authentication code 190 to either or both the error location and correction circuitry 220 and/or the device recovery circuitry 230.

In embodiments, the decryption circuitry 210 may decrypt the received GIMAC 190 using the third secret key $K_G$ via the following formula:

$$G \leftarrow \text{AES\_DECRYPT}_{K_G}(\text{GIMAC}) \qquad (8)$$

The decryption circuitry 210 may then determine the parity of the plurality of ciphertext data blocks 170 using either the GMAC/decrypted GIMAC authentication tag via the following formula:

$$P = G + C_G \qquad (9)$$

In the above, the "+" operation is a carry-less addition operation performed in base-2 Galois Field (i.e., GF(2)). In the absence of any errors in the ciphertext data blocks 170, the parity value determined by equation (9) should be given by the following formula:

$$P = C_0 \cdot H + C_1 \cdot H^2 + \ldots + C_{n-1} \cdot H^n \qquad (10)$$

The decryption circuitry 210 may determine a substitute value ($S_i$) for each of the ciphertext blocks ($C_i$) using any currently available or future developed processor method to determine the substitute value ($S_0 \ldots S_{n-1}$) for each respective one of the ciphertext blocks ($C_0 \ldots C_{n-1}$). For example, in some embodiments, the decryption circuitry 210 may determine the substitute value ($S_i$) for each of the ciphertext blocks ($C_i$), using the parity value determined using equation (10) above, according to the following formula:

$$S_i \leftarrow (\Sigma_{j \in [0, n-1], j \neq i} C_j \cdot H^{j+1} + P) \cdot H^{-i-1} \qquad (11)$$

The error location and/or correction circuitry 220 includes any number and/or combination of currently available and/or future developed electrical components, semiconductor devices, or logic elements capable of receiving the decrypted ciphertext blocks 170 ($C_0 \ldots C_{n-1}$) and the substitute blocks ($S_0 \ldots S_{n-1}$) from the decryption circuitry 210, determining the location of errors in the received blocks and correcting the errors in the blocks using the substitute blocks to reconstitute the original plaintext data blocks ($P_0 \ldots P_{n-1}$). In embodiments, the error location and/or correction circuitry 220 may use and/or implement in any combination of hardware and software/firmware any currently available or future developed error detection, location, and correction system and/or method.

For example, using equation (11), if no errors exist the substitute value ($S_i$) should be complimentary to the value of the corresponding ciphertext block ($C_i$). The hamming weight ($W_i$) is a count of the number of non-zero entities included in the comparison between the substitute value ($S_i$) should equal the value of the corresponding ciphertext block ($C_i$). Since the substitute block ($S_i$) is complimentary to the corresponding ciphertext block ($C_i$), a value of "0" should be returned in the absence of errors by adding or summing corresponding blocks:

$$W_i = S_i + C_i, \text{ for all } i \quad (12)$$

Thus, the hamming weight provides a measure or an indication of the number of blocks containing errors. Assuming that the determined hamming weight ($W_i$) includes data indicative of an error "e" that is less than a defined threshold value "T" and also assuming that the error occurs at an index position "$i_{err}$" other than the parity position, the value of the block $C_i$ at the location of the error is no longer $C_{i_{err}}$ but is instead given by $C_{i_{err}} + e$. Thus, equation (11) provides the following relationship From equation (11), the following equations may be deduced:

$$S_i + C_i = e \cdot H^{i_{err}-i}, \text{ for } i \neq i_{err} \quad (13)$$

$$S_i + C_i = e, \text{ for } i = i_{err} \quad (14)$$

Since H is the secret hash key value, the hamming weight ($W_i$) is small only where the index "i" equals the index of the erroneous block. Thus, the error location and/or correction circuitry 220 may determine the location of the erroneous block by comparing the hamming weight ($W_i$) for the block to a threshold value to determine whether the respective hamming weight is less than the threshold value.

Upon detecting the erroneous ciphertext block ($C_i$), the error location and/or correction circuitry 220 is able to correct the block by substituting the corresponding substitute value ($S_i$):

$$C_i \leftarrow S_i \quad (15)$$

In the event of a device failure or similar corruption of all ciphertext blocks ($C_0 \ldots C_{n-1}$), the device recovery circuitry 230 may replace every one of the ciphertext blocks ($C_0 \ldots C_{n-1}$) associated with the failed device with the corresponding substitute value ($S_0 \ldots S_{n-1}$):

$$C_{0 \ldots n-1} \leftarrow S_{0 \ldots n-1} \quad (16)$$

In embodiments where the error occurs in the encrypted GMAC value (i.e., the GIMAC), the error location and/or correction circuitry 220 may determine a substitute value according to:

$$S_{GIMAC} \leftarrow \text{AES\_ENCRYPT}_{K_G}(\Sigma_{j \in [0,n-1]} C_j \cdot H^{j+1} + C_G) \quad (17)$$

If the hamming weight of the entity $S_{GIMAC}$+GIMAC is less than the threshold value "T", the error has occurred in the parity. In such instances, the error location and/or correction circuitry 220 may correct the parity by assigning:

$$\text{GIMAC} \leftarrow S_{GIMAC} \quad (18)$$

In embodiments, the error location and/or correction circuitry 220 may identify errors at more than one ciphertext block using a respective parity value calculated for each of the ciphertext blocks. In such instances, the number of parity values generally exceeds the number of erroneous ciphertext blocks.

Although equations (8) through (18) provide an illustrative example of how the systems and methods described herein may be used to perform error detection, error location, error correction, and/or device recovery, other systems and methods may be used to similarly perform error detection, error location, error correction, and/or device recovery. In addition, the systems and methods described herein may be adapted to provide error detection, error location, and error correction for errors that occur at more than one location and/or more than one parity value. In such instances, the systems and methods disclosed herein may determine parity values using the encrypted GMAC having different initialization vectors ($IV_1 \ldots IV_n$), different secret encryption keys ($K_1 \ldots K_n$) and/or different secret hash key values ($H_1 \ldots H_n$). In embodiments, the number of parity values should equal or be greater than the number of errors to be corrected.

In such embodiments, the systems and methods disclosed herein may follow a similar procedure to that outlined above using equations (8) through (18), however the test to detect whether an error has occurred within a ciphertext block ($C_i$) 170 does not use the hamming weight of entities $S_i + C_i$ but instead uses the observed values of $S_i + C_i$ in combination with equation (9) above to solve a linear system that returns possible values for errors that may be present within the ciphertext blocks 170. The initial assumption for the location of each error is correct if the hamming weight ($W_i$) for each returned error value is less than the threshold value.

For example, consider an embodiment in which two parity values are used for the purpose of correcting errors in two devices or for full recovery of two devices. These parity values may have a form defined by the following equations:

$$P = C_0 \cdot H_1 + C_1 \cdot H_1^2 + \ldots + C_{n-1} \cdot H_1^n \quad (19)$$

$$Q = C_0 \cdot H_2 + C_1 \cdot H_2^2 + \ldots + C_{n-1} \cdot H_2^n \quad (20)$$

Using each of the parity values P and Q, two substitute values $S_i$ and $T_i$ may be determined for each of the ciphertext blocks Ci 170 using the following equations:

$$S_i \leftarrow (\Sigma_{j \in [0,n-1], j \neq i} C_j \cdot H_1^{j+1} + P) \cdot H_1^{-i-1} \quad (21)$$

$$T_i \leftarrow (\Sigma_{j \in [0,n-1], j \neq i} C_j \cdot H_2^{j+1} + P) \cdot H_2^{-i-1} \quad (22)$$

Assuming that two errors $e_1$ and $e_2$ associated represent errors having respective hamming weights less than the threshold value and that the errors occur at index positions $i = I_1$ and $i = I_2$ where $I_1$ and $I_2$ are locations other than the location of parity bits. Thus:

$$I_1 = C_{I_1} + e_1 \quad (23)$$

$$I_2 = C_{I_2} + e_2 \quad (24)$$

Combining equations (23) and (24) with equations (19) through (22) provides the following:

$$S_i + C_i = e_1 \cdot H_1^{I1-i} + e_2 \cdot H_1^{I2-i} \quad (25)$$

$$T_i + C_i = e_1 \cdot H_2^{I1-i} + e_2 \cdot H_2^{I2-i} \quad (26)$$

Equations (25) and (26) are linearly independent and form a system that can be solved in order to determine the values of the unknowns are $e_1$ and $e_2$. The system can be formed for any index i and any pair of $I_1$ and $I_2$. The pair for which the returned $e_1$ and $e_2$ are below a threshold indicates the correct locations of the errors.

In case one of the two errors is in one of the two parity positions, a different procedure may be employed. First, the error which is in an input block is identified and corrected using the correct of the two parity values. Next the error which is in the corrupted parity is corrected using the standard procedure of equations (17) and (18). If both errors include parity value errors then these errors are corrected using equations (17) and (18) twice.

If two devices fail at known locations $I_1$ and $I_2$ other than the parity locations, the content of these devices can be recovered by solving the system of equations (21) and (22) for $e_1$ and $e_2$. If an input block device and a parity device fail, then the input block device is recovered using the functioning parity device and the failed parity device is recovered by being recomputed from the available input blocks. If both parity device fail, they are being recomputed from the available input blocks.

Figure 3:
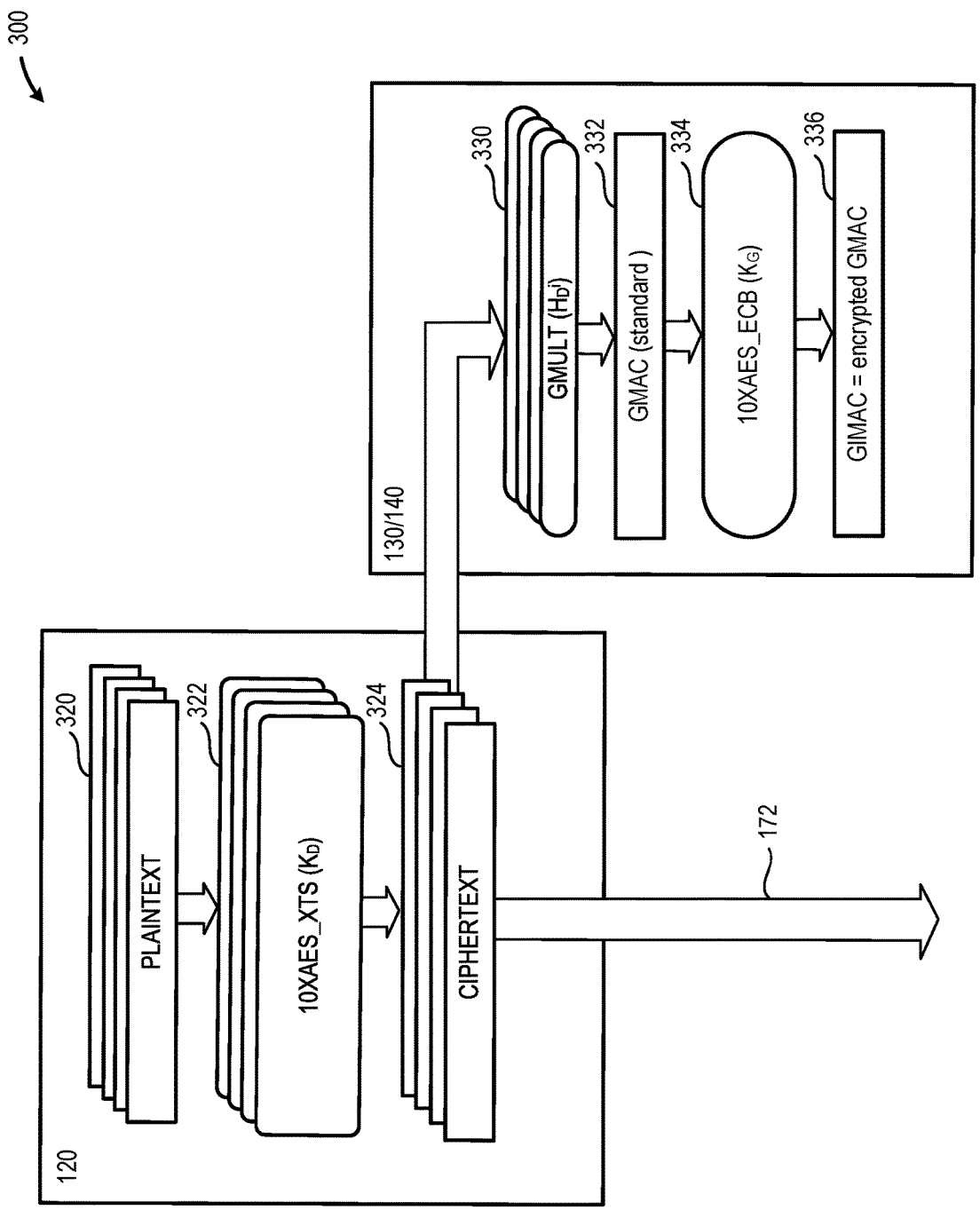
FIG. 3 is a schematic diagram of an illustrative system that includes plaintext encryption circuitry, authentication circuitry, and authentication encryption circuitry, in accordance with at least one embodiment described herein.

FIG. 3 is a schematic diagram of an illustrative system 300 that includes plaintext encryption circuitry 120, authentication circuitry 130, and authentication encryption circuitry 140, in accordance with at least one embodiment described herein. As depicted in FIG. 3, the plaintext encryption circuitry 120 receives a plurality (i.e., "n") of plaintext blocks 320. Each of the plaintext blocks 320 may be of any size, such as 128-bit plaintext blocks. The plaintext encryption circuitry 120 applies a NIST approved standard encryption 322, such as an advanced encryption standard (AES) compliant encryption, such as AES-XTS using a secret key value $K_D$, to each of the received plaintext blocks 320 to provide a plurality of ciphertext data blocks 324. The plaintext encryption circuitry 120 communicates 172 the plurality of ciphertext data blocks to one or more external destinations. One such external destination may include but is not limited to one or more memory circuits (cache memory circuitry, system memory circuitry, etc.) disposed within the host device of the encryption system 110. Another such destination may include but is not limited to one or more memory circuits disposed in one or more remote devices, such as one or more memory circuits disposed in one or more networked peer devices and/or one or more memory circuits disposed in one or more cloud-based storage devices.

The system 300 also includes authentication circuitry 130 that applies a Galois field multiplication authentication 330 to the plurality of ciphertext blocks 324 received from the plaintext encryption circuitry 120. The resultant Galois Message Authentication Code (GMAC) 332 may then be communicated to the authentication encryption circuitry 140. The authentication encryption circuitry 140 applies a NIST approved standard encryption 334. In embodiments, the NIST approved standard encryption may include an advanced encryption standard (AES) compliant encryption, such as AES-ECB using a secret key value $K_G$, to the GMAC authentication tag 332 to provide a GIMAC authentication tag 336 that includes the GMAC authentication tag by the authentication encryption circuitry 140. The authentication encryption circuitry 140 communicates 174 the GIMAC authentication tag to one or more external destinations. In embodiments, the authentication encryption circuitry 140 communicates 174 the GIMAC authentication tag 336 contemporaneous or simultaneous with the communication 172 of the plurality of ciphertext blocks 324 by the plaintext encryption circuitry 120. One such external destination may include one or more memory circuits (cache memory circuitry, system memory circuitry, etc.) disposed within the host device of the encryption system 110. Another such destination may include but is not limited to one or more memory circuits disposed in one or more remote devices, such as one or more memory circuits disposed in one or more networked peer devices and/or one or more memory circuits disposed in one or more cloud-based storage devices.

Figure 4:
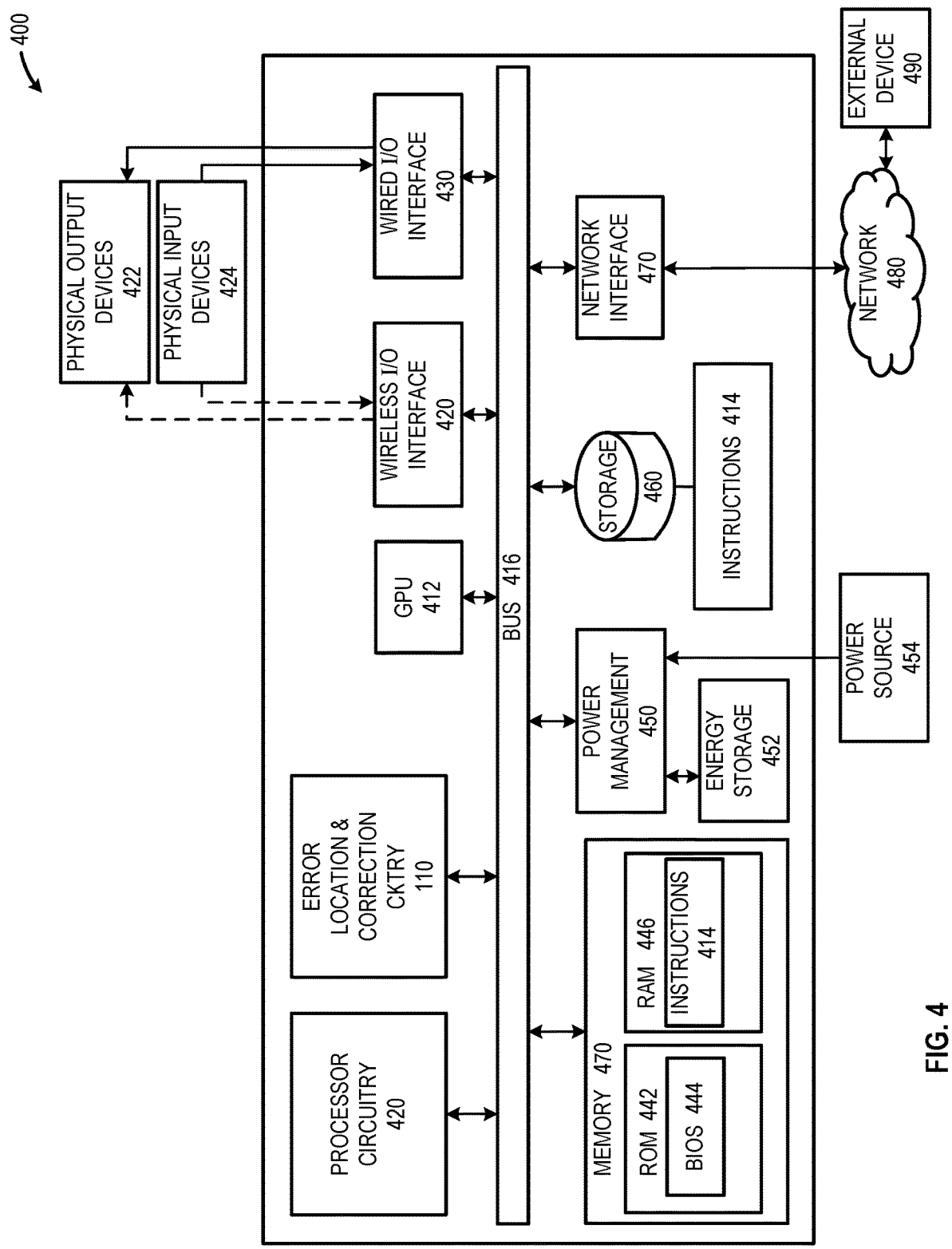
FIG. 4 is a schematic diagram of an illustrative electronic, processor-based, device that includes a central processing unit (CPU) or processor circuitry and encryption system circuitry such as described in FIGS. 1-4, in accordance with at least one embodiment described herein.

FIG. 4 is a schematic diagram of an illustrative electronic, processor-based, device 400 that includes a central processing unit (CPU) or processor circuitry 410 and encryption system circuitry 110 such as described in FIGS. 1-4, in accordance with at least one embodiment described herein. The processor-based device 400 may additionally include graphical processing unit (GPU) circuitry 412. The processor-based device 400 may additionally include one or more of the following: a wireless input/output (I/O) interface 420, a wired I/O interface 430, system memory circuitry 440, power management circuitry 450, a non-transitory storage device 460, and a network interface 470 used to communicatively couple the processor-based device 400 to one or more external devices (e.g., a cloud-based server) 490 via one or more networks 480. The following discussion provides a brief, general description of the components forming the illustrative processor-based device 400. Example, non-limiting processor-based devices 400 may include, but are not limited to: autonomous motor vehicles, semi-autonomous motor vehicles, manually controlled motor vehicles, smartphones, wearable computers, portable computing devices, handheld computing devices, desktop computing devices, blade server devices, workstations, and similar.

Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 410 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 400 includes a bus or similar communications link 416 that communicably couples and facilitates the exchange of information and/or data between various system components including the processor circuitry 410, the graphics processor circuitry 412, one or more wireless I/O interfaces 420, one or more wired I/O interfaces 430, the system memory 440, one or more storage devices 460, and/or the network interface circuitry 470. The processor-based device 400 may be referred to in the singular herein, but this is not intended to limit the embodiments to a single processor-based device 400, since in certain embodiments, there may be more than one processor-based device 400 that incorporates, includes, or contains any number of communicably coupled, collocated, or remote networked circuits or devices.

The processor circuitry 410 may include any number, type, or combination of currently available or future developed devices capable of executing machine-readable instruction sets. The processor circuitry 410 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components of the processor-based device 400 may employ any currently available or future developed serial or parallel bus structures or architectures.

The system memory 440 may include read-only memory ("ROM") 442 and random access memory ("RAM") 446. A portion of the ROM 442 may be used to store or otherwise retain a basic input/output system ("BIOS") 444. The BIOS 444 provides basic functionality to the processor-based device 400, for example by causing the processor circuitry 410 to load and/or execute one or more machine-readable instruction sets 414. In embodiments, at least some of the one or more machine-readable instruction sets 414 cause at least a portion of the processor circuitry 410 to provide, create, produce, transition, and/or function as a dedicated, specific, and particular machine.

The processor-based device 400 may include at least one wireless input/output (I/O) interface 420. The at least one wireless I/O interface 420 may be communicably coupled to one or more physical output devices 422 (tactile devices, video displays, audio output devices, hardcopy output devices, etc.). The at least one wireless I/O interface 420 may communicably couple to one or more physical input devices 424 (pointing devices, touchscreens, keyboards, tactile devices, etc.). The at least one wireless I/O interface 420 may include any currently available or future developed wireless I/O interface. Example wireless I/O interfaces include, but are not limited to: BLUETOOTH®, near field communication (NFC), and similar.

The processor-based device 400 may include one or more wired input/output (I/O) interfaces 430. The at least one wired I/O interface 430 may be communicably coupled to one or more physical output devices 422 (tactile devices, video displays, audio output devices, hardcopy output devices, etc.). The at least one wired I/O interface 430 may be communicably coupled to one or more physical input devices 424 (pointing devices, touchscreens, keyboards, tactile devices, etc.). The wired I/O interface 430 may include any currently available or future developed I/O interface. Example wired I/O interfaces include but are not limited to: universal serial bus (USB), IEEE 1394 ("FireWire"), and similar.

The processor-based device 400 may include one or more communicably coupled, non-transitory, data storage devices 460. The data storage devices 460 may include one or more hard disk drives (HDDs) and/or one or more solid-state storage devices (SSDs). The one or more data storage devices 460 may include any current or future developed storage appliances, network storage devices, and/or systems. Non-limiting examples of such data storage devices 460 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 460 may include one or more removable storage devices, such as one or more flash drives, flash memories, flash storage units, or similar appliances or devices capable of communicable coupling to and decoupling from the processor-based device 400.

The one or more data storage devices 460 may include interfaces or controllers (not shown) communicatively coupling the respective storage device or system to the bus 416. The one or more data storage devices 460 may store, retain, or otherwise contain machine-readable instruction sets, data structures, program modules, data stores, databases, logical structures, and/or other data useful to the processor circuitry 410 and/or graphics processor circuitry 412 and/or one or more applications executed on or by the processor circuitry 410 and/or graphics processor circuitry 412. In some instances, one or more data storage devices 460 may be communicably coupled to the processor circuitry 410, for example via the bus 416 or via one or more wired communications interfaces 430 (e.g., Universal Serial Bus or USB); one or more wireless communications interfaces 420 (e.g., Bluetooth®, Near Field Communication or NFC); and/or one or more network interfaces 470 (IEEE 802.3 or Ethernet, IEEE 802.11, or WiFi®, etc.).

Machine-readable instruction sets 414 and other programs, applications, logic sets, and/or modules may be stored in whole or in part in the system memory 440. Such instruction sets 414 may be transferred, in whole or in part, from the one or more data storage devices 460. The instruction sets 414 may be loaded, stored, or otherwise retained in system memory 440, in whole or in part, during execution by the processor circuitry 410 and/or graphics processor circuitry 412.

The processor-based device 400 may include power management circuitry 450 that controls one or more operational aspects of the energy storage device 452. In embodiments, the energy storage device 452 may include one or more primary (i.e., non-rechargeable) or secondary (i.e., rechargeable) batteries or similar energy storage devices. In embodiments, the energy storage device 452 may include one or more supercapacitors or ultracapacitors. In embodiments, the power management circuitry 450 may alter, adjust, or control the flow of energy from an external power source 454 to the energy storage device 452 and/or to the processor-based device 400. The power source 454 may include, but is not limited to, a solar power system, a commercial electric grid, a portable generator, an external energy storage device, or any combination thereof.

For convenience, the processor circuitry 410, the GPU circuitry 412, the wireless I/O interface 420, the wired I/O interface 430, the system memory circuitry 440, the power management circuitry 450, the storage device 460, and the network interface 470 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In another example, one or more of the above-described components may be integrated into the processor circuitry 410 and/or the graphics processor circuitry 412. In some embodiments, all or a portion of the bus 416 may be omitted and the components are coupled directly to each other using suitable wired or wireless connections.

Figure 5:
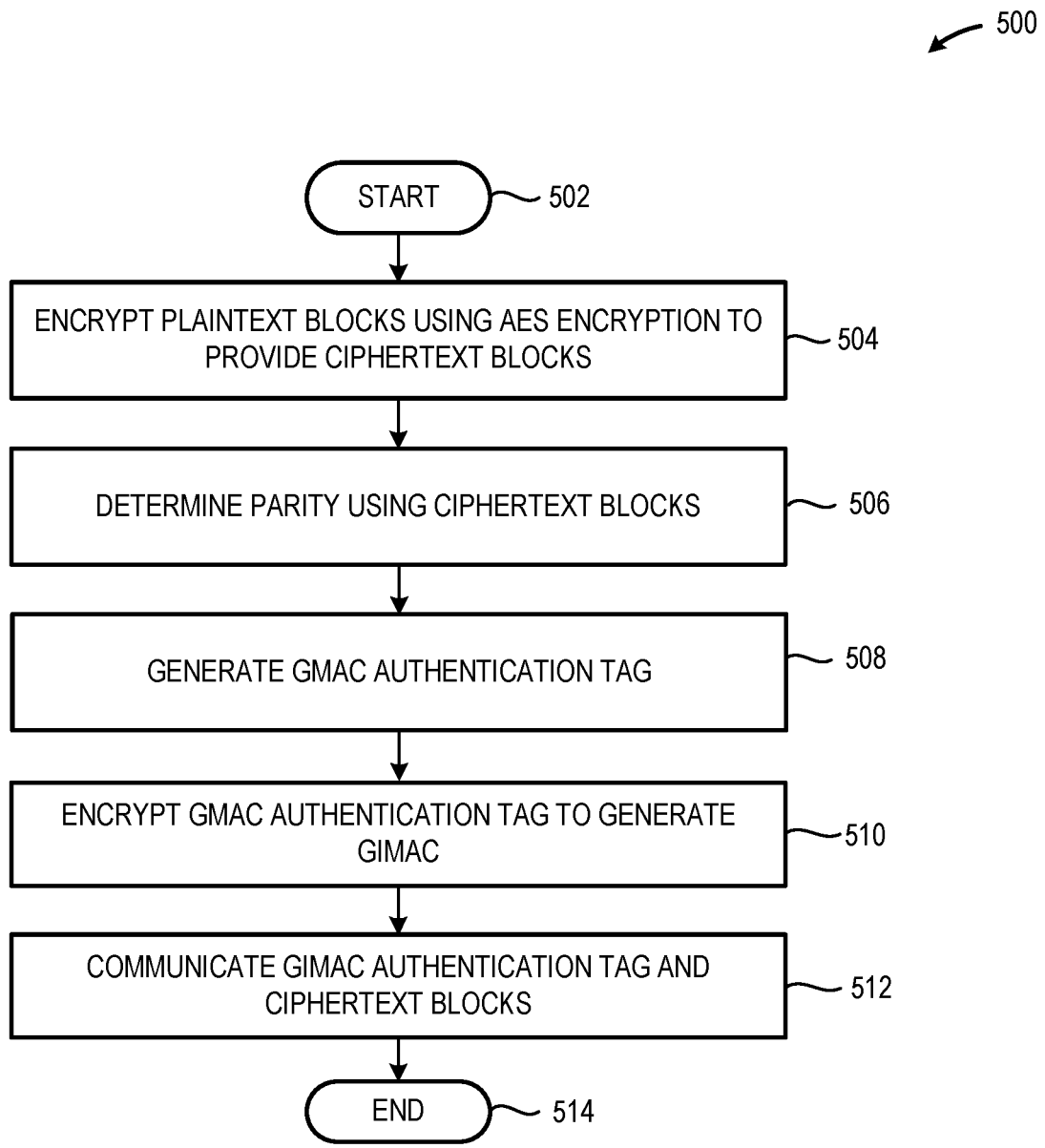
FIG. 5 is a high-level flow diagram of an illustrative method of encrypting a plurality of plaintext blocks to provide a plurality of ciphertext blocks and generating a Galois Message Authentication Code (GMAC) authentication tag/parity data based upon the plurality of ciphertext blocks, in accordance with at least one embodiment described herein.

FIG. 5 is a high-level flow diagram of an illustrative method 500 of encrypting a plurality of plaintext blocks 160 to provide a plurality of ciphertext blocks 170 and generating a Galois Message Authentication Code (GMAC) authentication tag/parity data based upon the plurality of ciphertext blocks 170, in accordance with at least one embodiment described herein. The method 500 beneficially makes use of a NIST approved encryption method, such as an Advanced Encryption Standard (AES) compliant encryption method, to encrypt the plaintext blocks 160 to provide the plurality of ciphertext blocks 170. Additionally, the method 500 generates the GMAC authentication tag 180 and determines parity using the ciphertext blocks 170 rather than the plaintext blocks 160, further enhancing security. Furthermore, the method 500 selectively encrypts the GMAC using a NIST approved encryption method to provide the GIMAC authentication tag 190. The method commences at 502.

At 504, the plaintext encryption circuitry 120 encrypts a plurality of plaintext data blocks 160 to provide a plurality of ciphertext data blocks 170. In embodiments, each of the plurality of plaintext data blocks 160 may include a 128-bit data block, a 192-bit data block, or a 256-bit data block. The plaintext encryption circuitry 120 uses any NIST standard encryption method, such as an Advanced Encryption Standard (AES) compliant encryption standard. In embodiments, the plaintext encryption circuitry 120 may use an Advanced Encryption Standard-XEX-based tweaked-codebook mode with ciphertext stealing (AES-XTS) encryption using a first secret key value ($K_D$) and a first initialization vector value ($IV_1$).

At 506, the authentication circuitry 130 generates an authentication tag using one or more of the plurality of ciphertext blocks 170. In embodiments, the authentication circuitry 130 may generate an authentication tag using Galois field multiplication. In embodiments, the authentication circuitry 130 may generate a Galois Message Authentication Code (GMAC) authentication tag. For example, the authentication circuitry 130 may determine the GMAC authentication tag according to the following formula (per National Institute for Standards and Technology ("NIST") Specification SP-800-38D, latest version):

$$G = C_0 \cdot H + C_1 \cdot H^2 + \ldots + C_{n-1} \cdot H^n + C_G \quad (27)$$

where:

$$C_G = (128n) \cdot H^{n+1} + C_{K_M, IV_2} \quad (28)$$

$C_{K_M, IV_2}$ = Constant Determined Using $IV_2$ and $K_m$

At 508, the authentication circuitry 130 determines a parity value using one or more of the plurality of ciphertext blocks 170. In at least some embodiments, the authentication circuitry 130 may determine the parity value using the GMAC authentication tag 180 generated at 506.

At 510, the authentication encryption circuitry 140 encrypts the GMAC authentication tag 180 to provide a GMAC-based, Improved, Memory Authentication, Cryptographic Integrity and Correction (GIMAC) authentication tag 190. The authentication encryption circuitry 140 may encrypt the GMAC 180 using any currently available or future developed AES-compliant encryption method. For example, the authentication encryption circuitry 140 may encrypt the GMAC 180 using an Advanced Encryption Standard in the ECB mode using the third secret key $K_G$ according to the following formula:

$$GIMAC = AES\_ENCRYPT_{K_G}(G) \quad (29)$$

At 512, the encryption system 110 communicates the plurality of ciphertext blocks 170 and the GIMAC authentication tag/parity data to one or more external devices. The method 500 concludes at 514.

Figure 6:
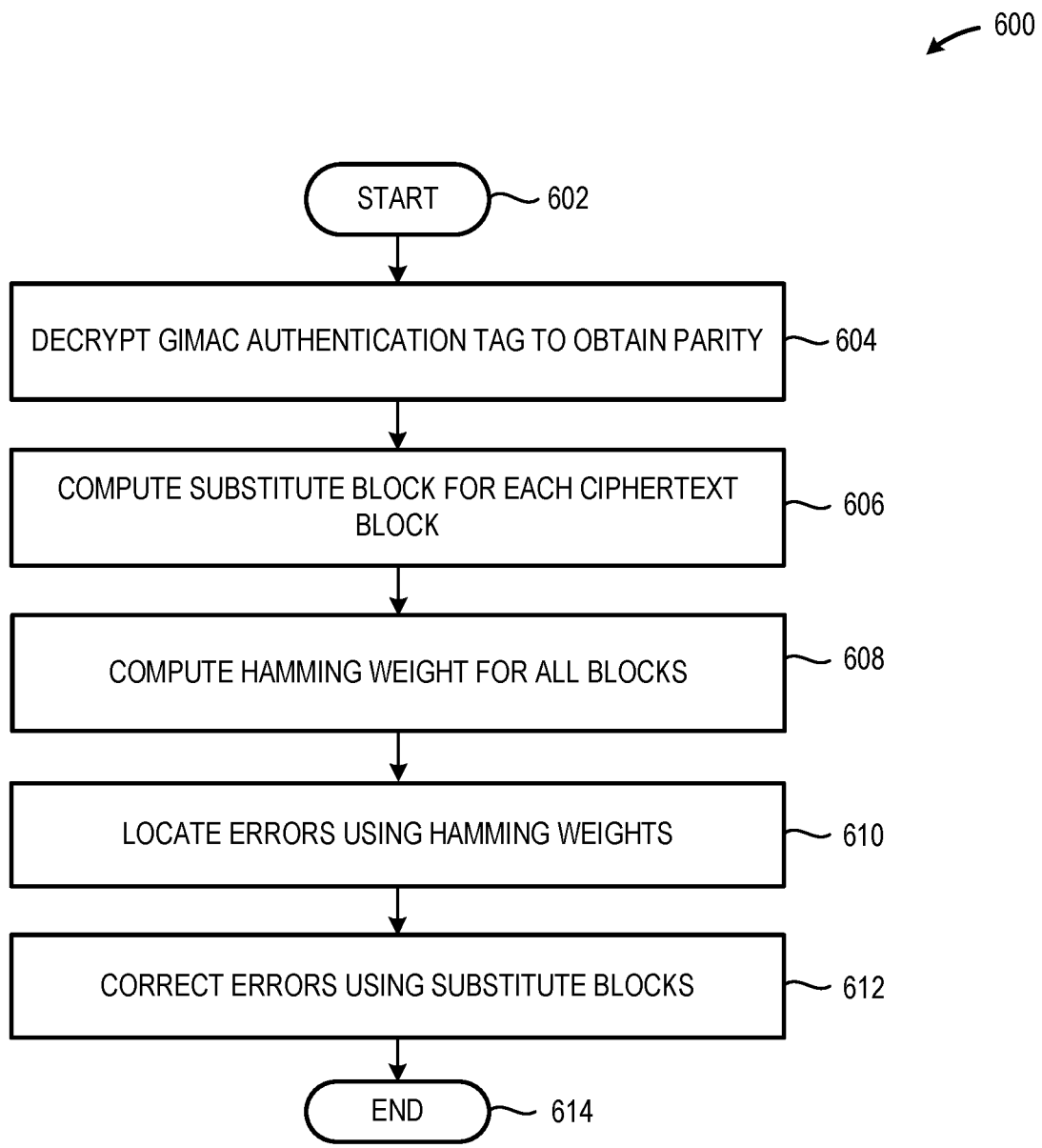
FIG. 6 is a high-level logic flow diagram of an illustrative method of decrypting the plurality of ciphertext data blocks and the GIMAC authentication tag/parity information and detecting, locating, and correcting errors in one or more of the plurality of ciphertext data blocks, in accordance with at least one embodiment described herein.

FIG. 6 is a high-level logic flow diagram of an illustrative method 600 of decrypting the plurality of ciphertext data blocks 170 and the GIMAC authentication tag/parity information 190 and detecting, locating, and correcting errors in one or more of the plurality of ciphertext data blocks 170, in accordance with at least one embodiment described herein. The method 600 commences at 602.

At 604, the decryption circuitry 210 decrypts the GIMAC authentication tag 190 to obtain the parity information associated with the plurality of ciphertext blocks 170.

At 606, the decryption circuitry 210 may determine a substitute value ($S_i$) for each of the ciphertext blocks ($C_i$), using the decrypted parity value ("P") and the secret hash key ("H") associated with the encryption performed by the plaintext encryption circuitry 120, according to the following formula:

$$S_i \leftarrow (\Sigma_{j \in [0, n-1], j \neq i} C_j \cdot H^{j+1} + P) \cdot H^{-i-1} \quad (30)$$

At 608, the decryption circuitry 210 determines a hamming weight ($W_i$) by by adding or summing corresponding blocks:

$$W_i = S_i + C_i, \text{ for all } i \quad (31)$$

At 610, the error location and/or correction circuitry 220 locates erroneous ciphertext blocks 170 using the hamming weights determined at 608. In embodiments, the error location and/or correction circuitry 220 identifies the erroneous ciphertext blocks via the following equations:

$$S_i + C_i = e \cdot H^{i_{err}-i}, \text{ for } i \neq i_{err} \quad (32)$$

$$S_i + C_i = e, \text{ for } i = i_{err} \quad (33)$$

The hamming weight ($W_i$) is small only where the index "i" equals the index of the erroneous block. Thus, the error location and/or correction circuitry 220 may determine the location of the erroneous block by comparing the hamming weight ($W_i$) for the block to a threshold value to determine whether the respective hamming weight is less than the threshold value.

At 612, upon detecting the erroneous ciphertext block ($C_i$), the error location and/or correction circuitry 220 is able to correct the block by substituting the corresponding substitute value ($S_i$):

$$C_i \leftarrow S_i \quad (34)$$

In the event of a device failure or similar corruption of all ciphertext blocks ($C_0 \ldots C_{n-1}$), the device recovery circuitry 230 may replace every one of the ciphertext blocks ($C_0 \ldots C_{n-1}$) associated with the failed device with the corresponding substitute value ($S_0 \ldots S_{n-1}$):

$$C_{0 \ldots n-1} \leftarrow S_{0 \ldots n-1} \quad (35)$$

The method 600 concludes at 614.

While FIGS. 5 and 6 illustrate various operations according to one or more embodiments, it is to be understood that not all of the operations depicted in FIGS. 5 and 6 are necessary for other embodiments. Indeed, it is fully contemplated herein that in other embodiments of the present disclosure, the operations depicted in FIGS. 5 and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums and/or devices. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for the secure transmission of plaintext data blocks encrypted using a NIST standard encryption to provide a plurality of ciphertext data blocks, and using the ciphertext data blocks to generate a Galois multiplication-based authentication tag and parity information that is communicated in parallel with the ciphertext blocks and provides a mechanism for error detection, location and correction for a single ciphertext data block or a plurality of ciphertext data blocks included on a storage device. The systems and methods include encrypting a plurality of plaintext blocks to provide a plurality of ciphertext blocks. The systems and methods include generating a Galois Message Authentication Code (GMAC) authentication tag and parity information using the ciphertext blocks. The GMAC authentication tag may be encrypted to provide a GIMAC authentication tag that is communicated in parallel with the ciphertext blocks to one or more recipient systems or devices.

The systems and methods disclosed herein decrypt the GIMAC authentication tag to generate the parity information associated with a received plurality of ciphertext blocks. The parity information is used to determine substitute blocks to replace one or more ciphertext blocks identified as containing one or more errors. The substitute blocks may be used to replace all of the ciphertext blocks associated with a failed device or system.

The following examples pertain to further embodiments. The following examples of the present disclosure may comprise subject material such as at least one device, a method, at least one machine-readable medium for storing instructions that when executed cause a machine to perform acts based on the method, means for encrypting plaintext blocks to provide ciphertext blocks that are used to generate a Galois Message Authentication Code (GMAC) authentication tag and parity information, encrypting the GMAC authentication tag to provide a GIMAC authentication tag, decrypting the GIMAC authentication tag to obtain parity information and performing error detection, location, and correction on the ciphertext blocks using the parity information.

According to example 1, there is provided an autonomous error correction and recovery system. The system may include: encrypt a plurality of plaintext blocks ($P_0 \ldots P_{n-1}$) to provide a plurality of ciphertext blocks ($C_0 \ldots C_{n-1}$); authentication circuitry communicatively coupled to the encryption circuitry, the authentication circuitry to: determine a parity value using the plurality of ciphertext blocks generated by the encryption circuitry; generate a Galois message authentication code (GMAC) authentication tag using the plurality of ciphertext blocks generated by the encryption circuitry; and a communication interface to receive the plurality of ciphertext blocks, the determined parity value, and the generated GMAC authentication tag.

Example 2 may include elements of example 1 where to encrypt a plurality of plaintext blocks ($P_0 \ldots P_{n-1}$) to provide a plurality of ciphertext blocks ($C_0 \ldots C_{n-1}$), the authentication circuitry to further: select an XEX-based tweaked-codebook mode with ciphertext stealing (XTS) mode of an AES compliant encryption; generate a first encryption key value ($K_D$); generate a first initialization vector ($IV_1$); and encrypt the plurality of plaintext blocks using AES-XTS encryption based on the generated secret key value ($K_D$) and the first initialization vector ($IV_1$).

Example 3 may include elements of any of examples 1 or 2 where, to generate the GMAC authentication tag, the authentication circuitry may further: determine a value representative of a second initialization vector ($IV_2$); generate a second encryption key value ($K_M$); and generate a hash key value H.

Example 4 may include elements of any of examples 1 through 3 where, to generate the GMAC authentication tag, the authentication circuitry may further: generate the GMAC authentication tag using the formula:

$$GMAC = C_0 \cdot H + C_1 \cdot H^2 + \ldots + C_{n-1} \cdot H^n + C_G$$

where:

$$C_G = (128n) \cdot H^{n+1} + C_{K_M,IV_2}$$

$C_{K_M,IV_2}$ = Constant Determined Using $IV_2$ and $K_m$

Example 5 may include elements of any of examples 1 through 4 where, to determine a value representative of the second initialization vector ($IV_2$), the authentication circuitry may further: determine a value representative of the initialization vector using a memory address associated with one or more of the plurality of plaintext blocks.

Example 6 may include elements of any of examples 1 through 5 and the authentication circuitry may further: selectively generate a third encryption key value ($K_G$); and selectively encrypt the GMAC using an AES compliant encryption and the generated third encryption key value to provide a GMAC-based, Improved, Memory Authentication and cryptographic integrity and Correction (GIMAC) authentication tag.

Example 7 may include elements of any of examples 1 through 6 and the system may further include: obtain a parity value included in a received message; determine a plurality of substitute blocks ($S_0 \ldots S_{n-1}$), each of the substitute blocks $S_i$ corresponding to one of the ciphertext blocks $C_i$; and determine a plurality of hamming weights ($W_i$) of the value $S_i + C_i$ for all "i."

Example 8 may include elements of any of examples 1 through 7 and the decryption circuitry may further, responsive to a determination that a received message includes a GMAC authentication tag, decrypt the received message to obtain the parity value included in the received message.

Example 9 may include elements of any of examples 1 through 8 and the system may additionally include: error location and correction circuitry to: for each of the plurality of hamming weights ($W_i$), determine, for each value "i," whether the respective hamming weight is non-zero and less than a threshold value; and, responsive to a determination that, for a value "i," that the respective hamming weight ($W_i$) is non-zero and less than a threshold value, replace the respective block $C_i$ with the block $S_i$.

Example 10 may include elements of any of examples 1 through 9 and the system may further include device recovery circuitry to: identify a failed storage device; determine an index associated with the identified failed storage device; and for all values "i," for all blocks $C_i$ associated with the failed storage device, replace blocks ($C_0 \ldots C_{1-n}$) with substitute blocks ($S_0 \ldots S_{1-n}$).

According to example 11, there is provided an autonomous error correction and recovery method. The method may include: encrypting, by encryption circuitry, a plurality of plaintext blocks ($P_0 \ldots P_{n-1}$) to provide a plurality of ciphertext blocks ($C_0 \ldots C_{n-1}$); determining, by authentication circuitry communicably coupled to the encryption circuitry, a parity value using the plurality of ciphertext blocks generated by the encryption circuitry; generating, by the authentication circuitry, a Galois message authentication code (GMAC) authentication tag using the plurality of ciphertext blocks generated by the encryption circuitry; communicating, by the encryption circuitry to a communicably coupled communication interface, the plurality of ciphertext blocks; and communicating, by the authentication circuitry to the communicably coupled communication interface, the determined parity value and the generated GMAC authentication tag.

Example 12 may include elements of example 11 where encrypting a plurality of plaintext blocks ($P_0 \ldots P_{n-1}$) to provide a plurality of ciphertext blocks ($C_0 \ldots C_{n-1}$) may further include: selecting, by the encryption circuitry, an XEX-based tweaked-codebook mode with ciphertext stealing (XTS) mode of an AES compliant encryption; generating, by the encryption circuitry, a first encryption key value ($K_D$); generating, by the encryption circuitry, a first initialization vector ($IV_1$); and encrypting, by the encryption circuitry, the plurality of plaintext blocks using AES-XTS encryption based on the generated secret key value ($K_D$) and the first initialization vector ($IV_1$).

Example 13 may include elements of any of examples 11 or 12 where generating the GMAC authentication tag may further include: determining, by the authentication circuitry, a value representative of a second initialization vector ($IV_2$); generating, by the authentication circuitry, a second encryption key value ($K_M$); and generating, by the authentication circuitry, a hash key value (H).

Example 14 may include elements of any of examples 11 through 13 where generating the GMAC authentication tag may further include: generating, by the authentication circuitry, the GMAC authentication tag using the formula:

$$GMAC = C_0 \cdot H + C_1 \cdot H^2 + \ldots + C_{n-1} \cdot H^n + C_G$$

where:

$$C_G = (128n) \cdot H^{n+1} + C_{K_M,IV_2}$$

$C_{K_M,IV_2}$ = Constant Determined Using $IV_2$ and $K_m$

Example 15 may include elements of any of examples 11 through 14 where determining a value representative of the second initialization vector ($IV_2$) may further include: determining, by the authentication circuitry, a value representative of the initialization vector using a memory address associated with one or more of the plurality of plaintext blocks.

Example 16 may include elements of any of examples 11 through 15, and the method may further include: selectively generating, by the authentication circuitry, a third encryption key value ($K_G$); and selectively encrypting, by the authentication circuitry, the GMAC using an AES compliant encryption and the generated third encryption key value to provide a GMAC-based, Improved, Memory Authentication and cryptographic integrity and Correction (GIMAC) authentication tag.

Example 17 may include elements of any of examples 11 through 16, and the method may further include: obtaining, by decryption circuitry communicatively coupled to the communication interface, a parity value included in a received message; determining, by the decryption circuitry, a plurality of substitute blocks ($S_1 \ldots S_n$), each of the substitute blocks ($S_i$) corresponding to one of the ciphertext blocks ($C_i$); and determining, by the decryption circuitry, a plurality of hamming weights ($W_i$) of the value $S_i + C_i$ for all "i."

Example 18 may include elements of any of examples 11 through 17 and the method may additionally include, responsive to a determination that a received message includes a GMAC authentication tag, decrypting, by the decryption circuitry, the received message to obtain the parity value included in the received message.

Example 19 may include elements of any of examples 11 through 18 and the method may additionally include, for each of the plurality of hamming weights ($W_i$), determining, by error location and correction circuitry, for each value "i," whether the respective hamming weight is non-zero and less than a threshold value; and responsive to a determination that, for a value "i," that the respective hamming weight ($W_i$) is non-zero and less than a threshold value, replacing, by the error location and correction circuitry, the respective ciphertext block ($C_i$) with the substitute block ($S_i$).

Example 20 may include elements of any of examples 11 through 19 and the method may additionally include: identifying, by device recovery circuitry, a failed storage device; determining, by the device recovery circuitry, an index associated with the identified failed storage device; and, for all values "i," for all ciphertext blocks ($C_i$) associated with the failed storage device, replacing, by the device recovery circuitry, ciphertext blocks ($C_0 \ldots C_{1-n}$) with substitute blocks ($S_0 \ldots S_{1-n}$).

According to example 21, there is provided an autonomous error correction and recovery system, comprising: means for encrypting a plurality of plaintext blocks ($P_0 \ldots P_{n-1}$) to provide a plurality of ciphertext blocks ($C_0 \ldots C_{n-1}$); means for determining a parity value using the plurality of ciphertext blocks generated by the encryption circuitry; means for generating a Galois message authentication code (GMAC) authentication tag using the plurality of ciphertext blocks generated by the encryption circuitry; means for communicating the plurality of ciphertext blocks; and means for communicating the determined parity value and the generated GMAC authentication tag.

Example 22 may include elements of example 21, where the means for encrypting a plurality of plaintext blocks ($P_0 \ldots P_{n-1}$) to provide a plurality of ciphertext blocks ($C_0 \ldots C_{n-1}$) further comprises: means for selecting an XEX-based tweaked-codebook mode with ciphertext stealing (XTS) mode of an AES compliant encryption; means for generating a first encryption key value ($K_D$); means for generating a first initialization vector ($IV_1$); and means for encrypting the plurality of plaintext blocks using AES-XTS encryption based on the generated secret key value ($K_D$) and the first initialization vector ($IV_1$).

Example 23 may include elements of any of examples 21 or 22 where the means for generating the GMAC authentication tag may further include: means for determining a value representative of a second initialization vector ($IV_2$); means for generating a second encryption key value ($K_M$); and means for generating a hash key value (H).

Example 24 may include elements of any of examples 21 through 23 where the means for generating the GMAC authentication tag may further include: means for generating the GMAC authentication tag using the formula:

$$GMAC = C_0 \cdot H + C_1 \cdot H^2 + \ldots + C_{n-1} \cdot H^n + C_G$$

where:

$$C_G = (128n) \cdot H^{n+1} + C_{K_M, IV_2}$$

$C_{K_M, IV_2}$ = Constant Determined Using $IV_2$ and $K_m$

Example 25 may include elements of any of examples 21 through 24 where the means for determining a value representative of the second initialization vector ($IV_2$) may further include: means for determining a value representative of the initialization vector using a memory address associated with one or more of the plurality of plaintext blocks.

Example 26 may include elements of any of examples 21 through 25, and the system may further include: means for selectively generating a third encryption key value ($K_G$); and means for selectively encrypting the GMAC using an AES compliant encryption and the generated third encryption key value to provide a GMAC-based, Improved, Memory Authentication and cryptographic integrity and Correction (GIMAC) authentication tag.

Example 27 may include elements of any of examples 21 through 26, and the system may further include: means for obtaining a parity value included in a received message; means for determining a plurality of substitute blocks ($S_1 \ldots S_n$), each of the substitute blocks ($S_i$) corresponding to one of the ciphertext blocks ($C_i$); and means for determining a plurality of hamming weights ($W_i$) of the value $S_i + C_i$ for all "i."

Example 28 may include elements of any of examples 21 through 27 and the system may further include: means for decrypting the received message to obtain the parity value included in the received message responsive to a determination that a received message includes a GMAC authentication tag.

Example 29 may include elements of any of examples 21 through 28 and the system may further include: means for determining for each of the plurality of hamming weights ($W_i$) whether the respective hamming weight is non-zero and less than a threshold value; and means for replacing the respective ciphertext block ($C_i$) with the substitute block ($S_i$) responsive to a determination that, for a value "i," that the respective hamming weight ($W_i$) is a non-zero value.

Example 30 may include elements of any of examples 21 through 29 and the system may further include device recovery circuitry to: means for identifying a failed storage device; means for determining an index associated with the identified failed storage device; and means for replacing ciphertext blocks ($C_0 \ldots C_{1-n}$) with substitute blocks ($S_0 \ldots S_{1-n}$) for all values "i," for all ciphertext blocks ($C_i$) associated with the failed storage device.

According to example 31, there is provided a non-transitory storage device. The non-transitory storage device may include instructions that, when executed by control circuitry, cause the control circuitry to: cause encryption circuitry to encrypt a plurality of plaintext blocks ($P_0 \ldots P_{n-1}$) to provide a plurality of ciphertext blocks ($C_0 \ldots C_{n-1}$); cause authentication circuitry to determine communicably coupled to the encryption circuitry, a parity value using the plurality of ciphertext blocks generated by the encryption circuitry; cause the authentication circuitry to generate a Galois message authentication code (GMAC) authentication tag using the plurality of ciphertext blocks generated by the encryption circuitry; cause the encryption circuitry to communicate to the plurality of ciphertext blocks a communicably coupled communication interface; and cause the authentication circuitry to communicate the determined parity value and the generated GMAC authentication tag to the communicably coupled communication interface.

Example 32 may include elements of example 31 where the instructions that cause the control circuitry to encrypt a plurality of plaintext blocks ($P_0 \ldots P_{n-1}$) to provide a plurality of ciphertext blocks ($C_0 \ldots C_{n-1}$) further cause the control circuitry to: cause the encryption circuitry to select an XEX-based tweaked-codebook mode with ciphertext stealing (XTS) mode of an AES compliant encryption; cause the encryption circuitry to generate a first encryption key value ($K_D$); cause the encryption circuitry to generate a first initialization vector ($IV_1$); and cause the encryption circuitry to encrypt the plurality of plaintext blocks using AES-XTS encryption based on the generated secret key value ($K_D$) and the first initialization vector ($IV_1$).

Example 33 may include elements of any of examples 31 or 32 where the instructions that cause the control circuitry to generate the GMAC authentication tag may further cause the control circuitry to: cause the authentication circuitry to determine a value representative of a second initialization vector ($IV_2$); cause the authentication circuitry to generate a second encryption key value ($K_M$); and cause the authentication circuitry to generate a hash key value (H).

Example 34 may include elements of any of examples 31 through 33 where the instructions that cause the control circuitry to generate the GMAC authentication tag may further cause the control circuitry to cause the authentication circuitry to generate the GMAC authentication tag using the formula:

$$GMAC = C_0 \cdot H + C_1 \cdot H^2 + \ldots + C_{n-1} \cdot H^n + C_G$$

where:

$$C_G = (128n) \cdot H^{n+1} + C_{K_M,IV_2}$$

$C_{K_M,IV_2}$ = Constant Determined Using $IV_2$ and $K_m$

Example 35 may include elements of any of examples 31 through 34 where the instructions that cause the control circuitry to determine a value representative of the second initialization vector ($IV_2$) further cause the control circuitry to cause the authentication circuitry to determine a value representative of the initialization vector using a memory address associated with one or more of the plurality of plaintext blocks.

Example 36 may include elements of any of examples 31 through 35 where the instructions may further cause the control circuitry to: cause the authentication circuitry to selectively generate a third encryption key value ($K_G$); and cause the authentication circuitry to selectively encrypt the GMAC using an AES compliant encryption and the generated third encryption key value to provide a GMAC-based, Improved, Memory Authentication and cryptographic integrity and Correction (GIMAC) authentication tag.

Example 37 may include elements of any of examples 31 through 36 where the instructions may further cause the control circuitry to: cause decryption circuitry communicatively coupled to the communication interface to obtain a parity value included in a received message; cause the decryption circuitry to determine a plurality of substitute blocks ($S_1$-$S_n$), each of the substitute clocks ($S_i$) corresponding to one of the ciphertext blocks ($C_i$); and cause the decryption circuitry to determine a plurality of hamming weights ($W_i$) of the value $S_i + C_i$ for all "i."

Example 38 may include elements of any of examples 31 through 37 where the instructions may further cause the control circuitry to: cause the decryption circuitry to decrypt the received message to obtain the parity value included in the received message responsive to a determination that a received message includes a GMAC authentication tag.

Example 39 may include elements of any of examples 31 through 38 where the instructions may further cause the control circuitry to: cause error location and correction circuitry to determine for each value "i," whether the respective hamming weight is non-zero and less than a threshold value for each of the plurality of hamming weights ($W_i$); and cause error location and correction circuitry to replace the respective ciphertext block ($C_i$) with the respective corresponding substitute block ($S_i$) responsive to a determination that, for a value "i," that the respective hamming weight ($W_i$) is non-zero and less than a threshold value.

Example 40 may include elements of any of example 31 through 39 where the instructions may further cause the control circuitry to: cause device recovery circuitry to identify a failed storage device; cause the device recovery circuitry to determine an index associated with the identified failed storage device; and cause the device recovery circuitry to replace all ciphertext blocks ($C_0 \ldots C_{1-n}$) with corresponding substitute blocks ($S_0 \ldots S_{1-n}$) for all ciphertext blocks ($C_i$) associated with the failed storage device.

According to example 41, there is provided a processor-based electronic device that includes: processor circuitry; processor cache memory circuitry communicatively coupled to the processor circuitry; system memory circuitry communicatively coupled to the processor circuitry; and autonomous error correction and recovery circuitry communicably coupled to the processor circuitry and the system memory circuitry, the autonomous error correction and recovery circuitry including: encryption circuitry to: encrypt a plurality of plaintext blocks ($P_0, P_1, \ldots P_{n-1}$) to provide a plurality of ciphertext blocks ($C_0, C_1, \ldots C_{n-1}$); authentication circuitry communicatively coupled to the encryption circuitry, the authentication circuitry to: generate a Galois message authentication code (GMAC) authentication tag using the plurality of ciphertext blocks generated by the encryption circuitry; determine a parity value using the GMAC authentication tag; and a communication interface to receive the plurality of ciphertext blocks, the determined parity value, the parity value, and the generated GMAC authentication tag.

Example 42 may include elements of example 41 where, to encrypt a plurality of plaintext blocks ($P_0, P_1, \ldots P_{n-1}$) to provide a plurality of ciphertext blocks ($C_0, C_1, \ldots C_{n-1}$), the authentication circuitry may further: select an XEX-based tweaked-codebook mode with ciphertext stealing (XTS) mode of an AES compliant encryption; generate a first encryption key value ($K_D$); generate a first initialization vector ($IV_1$); and encrypt the plurality of plaintext blocks using AES-XTS encryption based on the generated secret key value ($K_D$) and the first initialization vector ($IV_1$).

Example 43 may include elements of any of examples 41 or 42 where, to generate the GMAC authentication tag, the authentication circuitry may further: determine a value representative of a second initialization vector ($IV_2$); generate a second encryption key value ($K_M$); and generate a hash key value (H).

Example 44 may include elements of any of examples 41 through 43 where, to generate the GMAC authentication tag, the authentication circuitry may further:

generate the GMAC authentication tag using the formula:

$$GMAC = C_0 \cdot H + C_1 \cdot H^2 + \ldots + C_{n-1} \cdot H^n + C_G$$

where:

$$C_G = (128n) \cdot H^{n+1} + C_{K_M,IV_2}$$

$C_{K_M,IV_2}$ = Constant Determined Using $IV_2$ and $K_m$

Example 45 may include elements of any of examples 41 through 44 where, to determine a value representative of the second initialization vector ($IV_2$), the authentication circuitry may further: determine a value representative of the initialization vector using a memory address associated with one or more of the plurality of plaintext blocks ($P_0, P_1, \ldots P_{n-1}$).

Example 46 may include elements of any of examples 41 through 45 and the authentication circuitry may further: selectively generate a third encryption key value ($K_G$); and selectively encrypt the GMAC using an AES compliant encryption and the generated third encryption key value to provide a GMAC-based, Improved, Memory Authentication and cryptographic integrity and Correction (GIMAC) authentication tag.

Example 47 may include elements of any of examples 41 through 46 and the autonomous error correction and recovery circuitry may further include decryption circuitry to: obtain a parity value included in a received message; determine a plurality of substitute blocks ($S_0, S_1, \ldots S_{n-1}$), each of the substitute blocks ($S_i$) corresponding to a respective one of the plurality of ciphertext blocks ($C_i$); and determine a plurality of hamming weights ($W_i$) of the value $S_i+C_i$ for all "i."

Example 48 may include elements of any of examples 41 through 47 and the decryption circuitry may further, responsive to a determination that a received message includes a GMAC authentication tag, decrypt the received message to obtain the parity value included in the received message.

Example 49 may include elements of any of examples 41 through 48 and the autonomous error correction and recovery circuitry may further include error location and correction circuitry to, for each of the plurality of hamming weights ($W_i$), determine, for each value "i," whether the respective hamming weight is non-zero and less than a threshold value; and, responsive to a determination that, for a value "i," that the respective hamming weight ($W_i$) is non-zero and less than a threshold value, replace the respective ciphertext block ($C_i$) with the corresponding substitute block ($S_i$).

Example 50 may include elements of any of examples 41 through 49 and the autonomous error correction and recovery circuitry may further include device recovery circuitry to: identify a failed storage device; determine an index associated with the identified failed storage device; and, for all values "i," for all ciphertext blocks ($C_i$) associated with the failed storage device, replace each of the plurality of ciphertext blocks ($C_0, C_1, \ldots C_{n-1}$) with the respective, corresponding, substitute block ($S_0, S_1, \ldots S_{n-1}$).

According to example 51, there is provided a secure data encryption and authentication system, the system being arranged to perform the method of any of examples 11 through 20.

According to example 52, there is provided a chipset arranged to perform the method of any of examples 11 through 20.

According to example 53, there is provided least one machine-readable storage device that includes a plurality of instructions that, in response to be being executed on a computing device, cause the computing device to carry out the method according to any of examples 11 through 20.

According to example 54, there is provided a device that includes a secure data encryption and authentication system, the device being arranged to perform the method of any of the examples 11 through 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. An autonomous error correction and recovery system, comprising:

encryption circuitry to:

encrypt a plurality of plaintext blocks ($P_0, P_1, \ldots P_{n-1}$) to provide a plurality of ciphertext blocks ($C_0, C_1, \ldots C_{n-1}$);

authentication circuitry communicatively coupled to the encryption circuitry, the authentication circuitry to:

generate a Galois message authentication code (GMAC) authentication tag using the plurality of ciphertext blocks generated by the encryption circuitry;

determine a parity value using the GMAC authentication tag; and a communication interface to receive the plurality of ciphertext blocks, the determined parity value, and the generated GMAC authentication tag.

2. The system of claim 1 wherein, to encrypt a plurality of plaintext blocks ($P_0, P_1, \ldots P_{n-1}$) to provide a plurality of ciphertext blocks ($C_0, C_1, \ldots C_{n-1}$), the authentication circuitry to further:

select an XEX-based tweaked-codebook mode with ciphertext stealing (XTS) mode of an AES compliant encryption;

generate a first encryption key value ($K_D$);

generate a first initialization vector ($IV_1$); and encrypt the plurality of plaintext blocks using AES-XTS encryption based on the generated secret key value ($K_D$) and the first initialization vector ($IV_1$).

3. The system of claim 1, wherein to generate the GMAC authentication tag, the authentication circuitry to further:

determine a value representative of a second initialization vector ($IV_2$);

generate a second encryption key value ($K_M$); and generate a hash key value (H).

4. The system of claim 3 wherein, to generate the GMAC authentication tag, the authentication circuitry to further:
generate the GMAC authentication tag using the formula:

$$GMAC = C_0 \cdot H + C_1 \cdot H^2 + \ldots + C_{n-1} \cdot H^n + C_G$$

where:

$$C_G = (128n) \cdot H^{n+1} + C_{K_M,IV_2}$$

$C_{K_M,IV_2}$ = Constant Determined Using $IV_2$ and $K_m$.

5. The system of claim 3, wherein to determine a value representative of the second initialization vector ($IV_2$), the authentication circuitry to further:
determine a value representative of the initialization vector using a memory address associated with one or more of the plurality of plaintext blocks ($P_0, P_1, \ldots P_{n-1}$).

6. The system of claim 1, the authentication circuitry to further:
selectively generate a third encryption key value ($K_G$); and
selectively encrypt the GMAC using an AES compliant encryption and the generated third encryption key value to provide a GMAC-based, Improved, Memory Authentication and cryptographic integrity and Correction (GIMAC) authentication tag.

7. The system of claim 1, further comprising:
decryption circuitry to:
obtain a parity value included in a received message;
determine a plurality of substitute blocks ($S_0, S_1, \ldots S_{n-1}$), each of the substitute blocks ($S_i$) corresponding to a respective one of the plurality of ciphertext blocks ($C_i$); and
determine a plurality of hamming weights ($W_i$) of the value $S_i + C_i$ for all "i".

8. The system of claim 7, the decryption circuitry to:
responsive to a determination that a received message includes a GMAC authentication tag, decrypt the received message to obtain the parity value included in the received message.

9. The system of claim 7, further comprising:
error location and correction circuitry to:
for each of the plurality of hamming weights ($W_i$), determine, for each value "i," whether the respective hamming weight is non-zero and less than a threshold value; and
responsive to a determination that, for a value "i," that the respective hamming weight ($W_i$) is non-zero and less than a threshold value, replace the respective ciphertext block ($C_i$) with the corresponding substitute block ($S_i$).

10. The system of claim 9, further comprising device recovery circuitry to:
identify a failed storage device;
determine an index associated with the identified failed storage device; and
for all values "i," for all ciphertext blocks ($C_i$) associated with the failed storage device, replace each respective one of the plurality of ciphertext blocks ($C_0, C_1, \ldots C_{n-1}$) with the corresponding substitute block ($S_0, S_1, \ldots S_{n-1}$).

11. A non-transitory storage device that includes instructions that, when executed by autonomous error location and correction circuitry, cause the autonomous error location and correction circuitry to:
cause encryption circuitry to encrypt a plurality of plaintext blocks ($P_0, P_1, \ldots P_{n-1}$) to generate a plurality of ciphertext blocks ($C_0, C_1, \ldots C_{n-1}$);
cause the authentication circuitry communicably coupled to the encryption circuitry to generate a Galois message authentication code (GMAC) authentication tag using one or more of the plurality of ciphertext blocks ($C_0, C_1, \ldots C_{n-1}$) generated by the encryption circuitry;
cause authentication circuitry communicably coupled to the encryption circuitry to determine a parity value using the GMAC authentication tag; and
cause the encryption circuitry to communicate the plurality of ciphertext blocks to a communicatively coupled communication interface; and
cause the authentication circuitry to communicate to the communicatively coupled communication interface at least one of: the determined parity value or the generated GMAC authentication tag.

12. The non-transitory storage device of claim 11, wherein the instructions that cause the autonomous error location and correction circuitry to encrypt a plurality of plaintext blocks ($P_0, P_1, \ldots P_{n-1}$) to provide a plurality of ciphertext blocks ($C_0, C_1, \ldots C_{n-1}$) further cause the autonomous error location and correction circuitry to:
cause the encryption circuitry to select an XEX-based tweaked-codebook mode with ciphertext stealing (XTS) mode of an AES compliant encryption (AES-XTS);
cause the encryption circuitry to generate a first encryption key value ($K_D$);
cause the encryption circuitry to generate a first initialization vector ($IV_1$); and
cause the encryption circuitry to encrypt the plurality of plaintext blocks using AES-XTS encryption using the generated secret key value ($K_D$) and the first initialization vector ($IV_1$).

13. The non-transitory storage device of claim 12, wherein the instructions that cause the autonomous error location and correction circuitry to generate the GMAC authentication tag further cause the autonomous error location and correction circuitry to:
cause the authentication circuitry to determine a value representative of a second initialization vector ($IV_2$);
cause the authentication circuitry to generate a second encryption key value ($K_M$); and
cause the authentication circuitry to generate a hash key value (H).

14. The non-transitory storage device of claim 13, wherein the instructions that cause the autonomous error location and correction circuitry to generate the GMAC authentication tag further cause the autonomous error location and correction circuitry to:
cause the authentication circuitry to generate the GMAC authentication tag using the formula:

$$GMAC = C_0 \cdot H + C_1 \cdot H^2 + \ldots + C_{n-1} \cdot H^n + C_G$$

where:

$$C_G = (128n) \cdot H^{n+1} + C_{K_M,IV_2}$$

$C_{K_M,IV_2}$ = Constant Determined Using $IV_2$ and $K_m$.

15. The non-transitory storage device of claim 13, wherein the instructions that cause the autonomous error location and correction circuitry to determine a value representative of the second initialization vector ($IV_2$) further cause the autonomous error location and correction circuitry to:

cause the authentication circuitry to determine a value representative of the initialization vector using a memory address associated with one or more of the plurality of plaintext blocks ($P_0, P_1, \ldots P_{n-1}$).

16. The non-transitory storage device of claim 11, wherein the instructions further cause the autonomous error location and correction circuitry to:
    cause the authentication circuitry to selectively generate a third encryption key value ($K_G$); and
    cause the authentication circuitry to selectively encrypt the GMAC using an AES compliant encryption and the generated third encryption key value to provide a GMAC-based, Improved, Memory Authentication and cryptographic integrity and Correction (GIMAC) authentication tag.

17. The non-transitory storage device of claim 11, wherein the instructions further cause the autonomous error location and correction circuitry to:
    cause decryption circuitry communicatively coupled to the communication interface to obtain a parity value included in a received message;
    cause the decryption circuitry to determine a plurality of substitute blocks ($S_0, S_1, \ldots S_{n-1}$), each of the substitute blocks ($S_i$) corresponding to a respective one ($C_i$) of the plurality of ciphertext blocks ($C_0, C_1, \ldots C_{n-1}$); and
    cause the decryption circuitry to determine a plurality of hamming weights ($W_i$) of the value $S_i + C_i$ for all "i".

18. The non-transitory storage device of claim 17, wherein the instructions further cause the autonomous error location and correction circuitry to:
    cause the decryption circuitry communicatively coupled to the decryption circuitry to decrypt the received message to obtain the parity value included in the received message responsive to a determination that a received message includes a GMAC authentication tag.

19. The non-transitory storage device of claim 17, wherein the instructions further cause the autonomous error location and correction circuitry to:
    cause error location and correction circuitry communicatively coupled to the decryption circuitry to determine, for each value "i," whether the respective hamming weight ($W_i$) is non-zero and less than a threshold value; and
    cause the error location and correction circuitry to replace the respective ciphertext block ($C_i$) with the corresponding substitute block ($S_i$) responsive to a determination that, for a value "i," that the respective hamming weight ($W_i$) is non-zero and less than a threshold value.

20. The non-transitory storage device of claim 19, wherein the instructions further cause the autonomous error location and correction circuitry to:
    cause device recovery circuitry to identify a failed storage device;
    cause the device recovery circuitry to determine an index associated with the identified failed storage device; and
    cause the device recovery circuitry to replace each respective one of the plurality of ciphertext blocks ($C_0, C_1, \ldots C_{n-1}$) with corresponding ones of the plurality of substitute blocks ($S_0, S_1, \ldots S_{n-1}$) for all ciphertext blocks ($C_i$) associated with the failed storage device.

21. An autonomous error correction and recovery system, comprising:
    means for encrypting a plurality of plaintext blocks ($P_0, P_1, \ldots P_{n-1}$) to generate a plurality of ciphertext blocks ($C_0, C_1, \ldots C_{n-1}$);
    means for generating a Galois message authentication code (GMAC) authentication tag using the plurality of ciphertext blocks generated by the encryption circuitry;
    means for determining a parity value using the GMAC authentication tag; and
    means for communicating the plurality of ciphertext blocks; and
    means for communicating at least one of: the determined parity value or the generated GMAC authentication tag to one or more external devices.

22. The system of claim 21, wherein the means for encrypting a plurality of plaintext blocks ($P_0, P_1, \ldots P_{n-1}$) to provide a plurality of ciphertext blocks ($C_0, C_1, \ldots C_{n-1}$) further comprises:
    means for selecting an XEX-based tweaked-codebook mode with ciphertext stealing (XTS) mode of an AES compliant encryption (AES-XTS);
    means for generating a first encryption key value ($K_D$);
    means for generating a first initialization vector ($IV_1$); and
    means for encrypting the plurality of plaintext blocks ($P_0, P_1, \ldots P_{n-1}$) using AES-XTS encryption based on the generated secret key value ($K_D$) and the first initialization vector ($IV_1$).

23. The system of claim 21, wherein the means for generating the GMAC authentication tag further comprises:
    means for determining a value representative of a second initialization vector ($IV_2$);
    means for generating a second encryption key value ($K_M$); and
    means for generating a hash key value (H).

24. The system of claim 23, wherein the means for generating the GMAC authentication tag further comprises:
    means for generating the GMAC authentication tag using the formula:

$$GMAC = C_0 \cdot H + C_1 \cdot H^2 + \ldots + C_{n-1} \cdot H^n + C_G$$

where:

$$C_G = (128n) \cdot H^{n+1} + C_{K_M, IV_2}$$

$C_{K_M, IV_2}$ = Constant Determined Using $IV_2$ and $K_m$.

25. A processor-based electronic device, comprising:
    processor circuitry;
    processor cache memory circuitry communicatively coupled to the processor circuitry;
    system memory circuitry communicatively coupled to the processor circuitry; and
    autonomous error correction and recovery circuitry communicably coupled to the processor circuitry and the system memory circuitry, the autonomous error correction and recovery circuitry including:
        encryption circuitry to:
            encrypt a plurality of plaintext blocks ($P_0, P_1, \ldots P_{n-1}$) to provide a plurality of ciphertext blocks ($C_0, C_1, \ldots C_{n-1}$);
        authentication circuitry communicatively coupled to the encryption circuitry, the authentication circuitry to:
            generate a Galois message authentication code (GMAC) authentication tag using the plurality of ciphertext blocks generated by the encryption circuitry; and
            determine a parity value using the GMAC authentication tag; and a communication interface to receive:
- the plurality of ciphertext blocks from the encryption circuitry; and
- the determined parity value, and the generated GMAC authentication tag from the authentication circuitry.

\* \* \* \* \*